(12) United States Patent
Sato

(10) Patent No.: US 8,717,995 B2
(45) Date of Patent: May 6, 2014

(54) COMMUNICATION APPARATUS, BASE STATION APPARATUS, MOBILE STATION APPARATUS, COMMUNICATION SYSTEM AND COMMUNICATION METHOD

(75) Inventor: Hiroyoshi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 13/402,588

(22) Filed: Feb. 22, 2012

(65) Prior Publication Data

US 2012/0147842 A1    Jun. 14, 2012

Related U.S. Application Data

(63) Continuation of application No. PCT/JP2009/064951, filed on Aug. 27, 2009.

(51) Int. Cl.
| | |
|---|---|
| *H04W 4/00* | (2009.01) |
| *H04W 72/04* | (2009.01) |
| *H04W 88/08* | (2009.01) |
| *H04W 76/00* | (2009.01) |

(52) U.S. Cl.
CPC .............. *H04W 72/04* (2013.01); *H04W 88/08* (2013.01); *H04W 76/00* (2013.01)
USPC ........... 370/329; 370/328; 370/348; 370/349; 455/423; 455/444; 455/522

(58) Field of Classification Search
None
See application file for complete search history.

(56) References Cited

U.S. PATENT DOCUMENTS 7,286,501 B2 * 10/2007 Kwon et al. .................. 370/320
7,346,020 B2 * 3/2008 Kwon et al. .................. 370/320
2003/0063620 A1 4/2003 You et al.
2009/0209247 A1 8/2009 Lee et al.
2010/0110897 A1 * 5/2010 Chun et al. .................... 370/241
2010/0290418 A1 11/2010 Nishio et al.
2011/0211538 A1 9/2011 Kakura
2011/0243088 A1 * 10/2011 Ahn et al. ...................... 370/329

FOREIGN PATENT DOCUMENTS

| CN | 101222260 | 7/2008 |
|---|---|---|
| CN | 101242625 | 8/2008 |
| EP | 1298856 | 4/2003 |
| JP | 2003-198654 | 7/2003 |

(Continued)

OTHER PUBLICATIONS

3GPP TS 36.211 V8.6.0; 3rd Generation Partnership Project;Technical Specification Group Radio Access Network; Evolved Universal Terrestrial Radio Access (E-UTRA);Physical Channels and Modulation(Release 8) Dated Mar. 2009.

(Continued)

*Primary Examiner* — Ian N Moore
*Assistant Examiner* — Latresa McCallum
(74) *Attorney, Agent, or Firm* — Myers Wolin, LLC

(57) ABSTRACT

A communication apparatus 1 includes a number-of-units determination unit 2 which determines the number of resource units to be allocated respectively to plural physical control channels by proportionally dividing the total number of resource units included in wireless resource which is designated for mapping of physical control channels among the plural physical control channels in accordance with a predetermined rule; a channel encoding unit 3 which channel-encodes the control information to be transmitted on the plural physical control channels respectively into data which can be transmitted by the number of resource units determined by said number-of-units determination unit; a modulation unit 4 which modulates the channel-encoded control information; and a transmission unit 5 which transmits the signal modulated by the modulation unit.

8 Claims, 29 Drawing Sheets

(56) References Cited

FOREIGN PATENT DOCUMENTS

| JP | 2008-289114 | 11/2008 |
|----|-------------|---------|
| JP | 2009-049579 | 3/2009 |
| WO | 2009/022565 | 2/2009 |
| WO | 2009/087742 | 7/2009 |

OTHER PUBLICATIONS

3GPP TS 36.212 V8.6.0; 3rd Generation Partnership Project; Technical Specification Group Radio Access Network; Evolved Universal Terrestrial Radio Access (E-UTRA); Multiplexing and channel coding (Release 8) Dated Mar. 2009.

3GPP TS 36.213 V8.6.0; 3rd Generation Partnership Project; Technical Specification Group Radio Access Network; Evolved Universal Terrestrial Radio Access (E-UTRA); Physical layer procedures (Release 8) Dated Mar. 2009.

International Search Report issued for corresponding International Patent Application No. PCT/JP2009/064951, mailed Nov. 24, 2009.

Notice of Reasons for Rejection issued for corresponding Japanese Patent Application No. 2011-528559, drafted Dec. 7, 2012, with partial English translation.

The extended European search report includes the supplementary European search report and the European search opinion issued for corresponding European Patent Application No. 09848725.9 dated Mar. 28, 2013.

Motorola; "E-UTRA DL L1/L2 Control Channel Design"; Agenda Item: 6.9.2; R1-070787; Feb. 12-16, 2007; 3GPP TSG RAN1 #48; St. Louis, USA.

\* cited by examiner

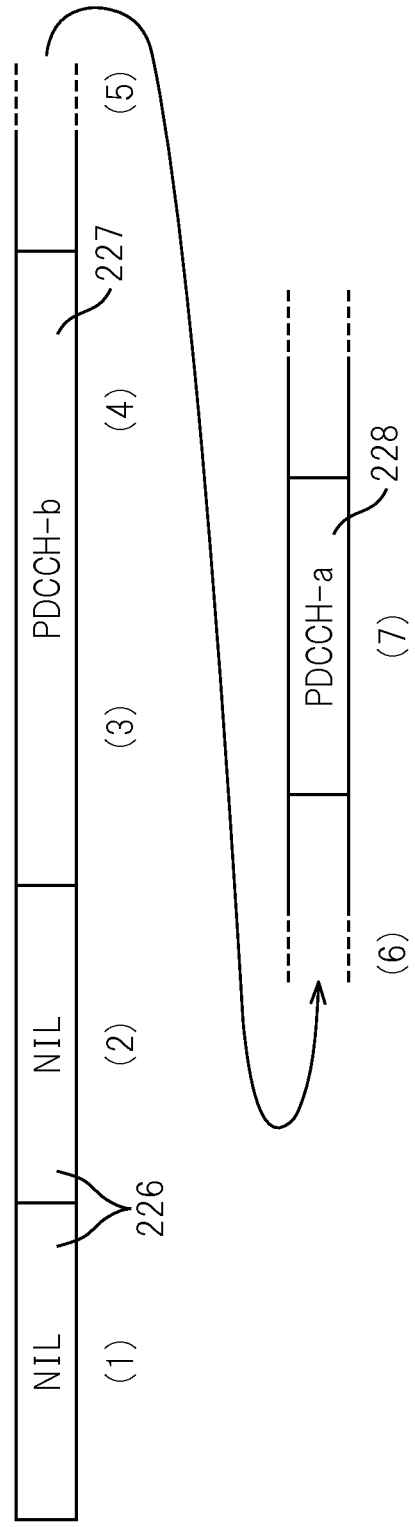

TO OPERATION DA OF FIG. 18

FIG.19

| CQI x | WEIGHTING COEFFICIENT w(x) |
|---|---|
| 0 | 3.5 |
| 1 | 3.4 |
| 2 | 3.3 |
| 3 | 3.2 |
| 4 | 3.1 |
| 5 | 3 |
| 6 | 2.9 |
| 7 | 2.8 |
| 8 | 2.7 |
| 9 | 2.6 |
| 10 | 2.5 |
| 11 | 2.4 |
| 12 | 2.3 |
| 13 | 2.2 |
| 14 | 2.1 |
| 15 | 2 |

FIG.20

| CHANNEL NUMBER i | 0 | 1 | 2 | 3 | 4 |
|---|---|---|---|---|---|
| CQI VALUE $Q_i$ | 5 | 8 | 2 | 15 | 0 |
| $Bit_i$ | 25 | 20 | 13 | 12 | 15 |
| $WeightedBit_i$ | 75 | 54 | 43 | 24 | 53 |
| $AllocatedREG_i$ (BEFORE ADJUSTMENT) | 9 | 6 | 5 | 2 | 6 |
| $AllocatedREG_i$ (AFTER ADJUSTMENT) | 10 | 7 | 6 | 2 | 6 |

F I G . 22A

| PDCCH -a | PDCCH -b | PDCCH -a | PDCCH -b | PDCCH -a | PDCCH -b | PDCCH -a | PDCCH -b | PDCCH -b |

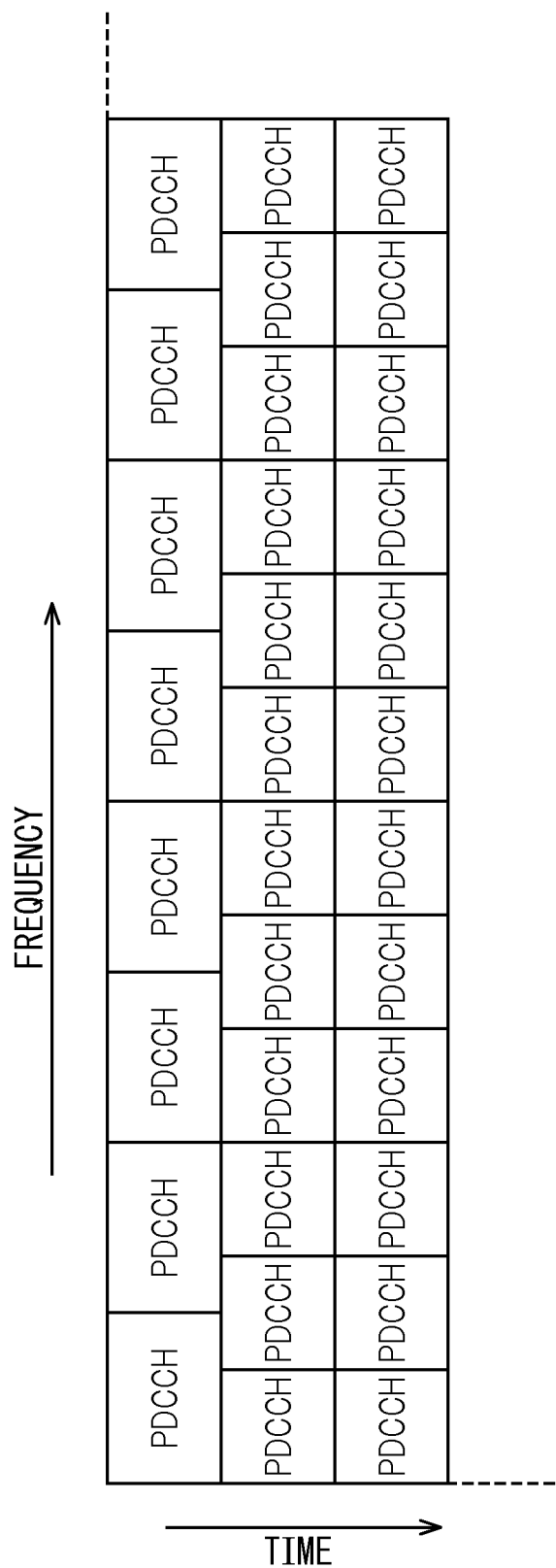

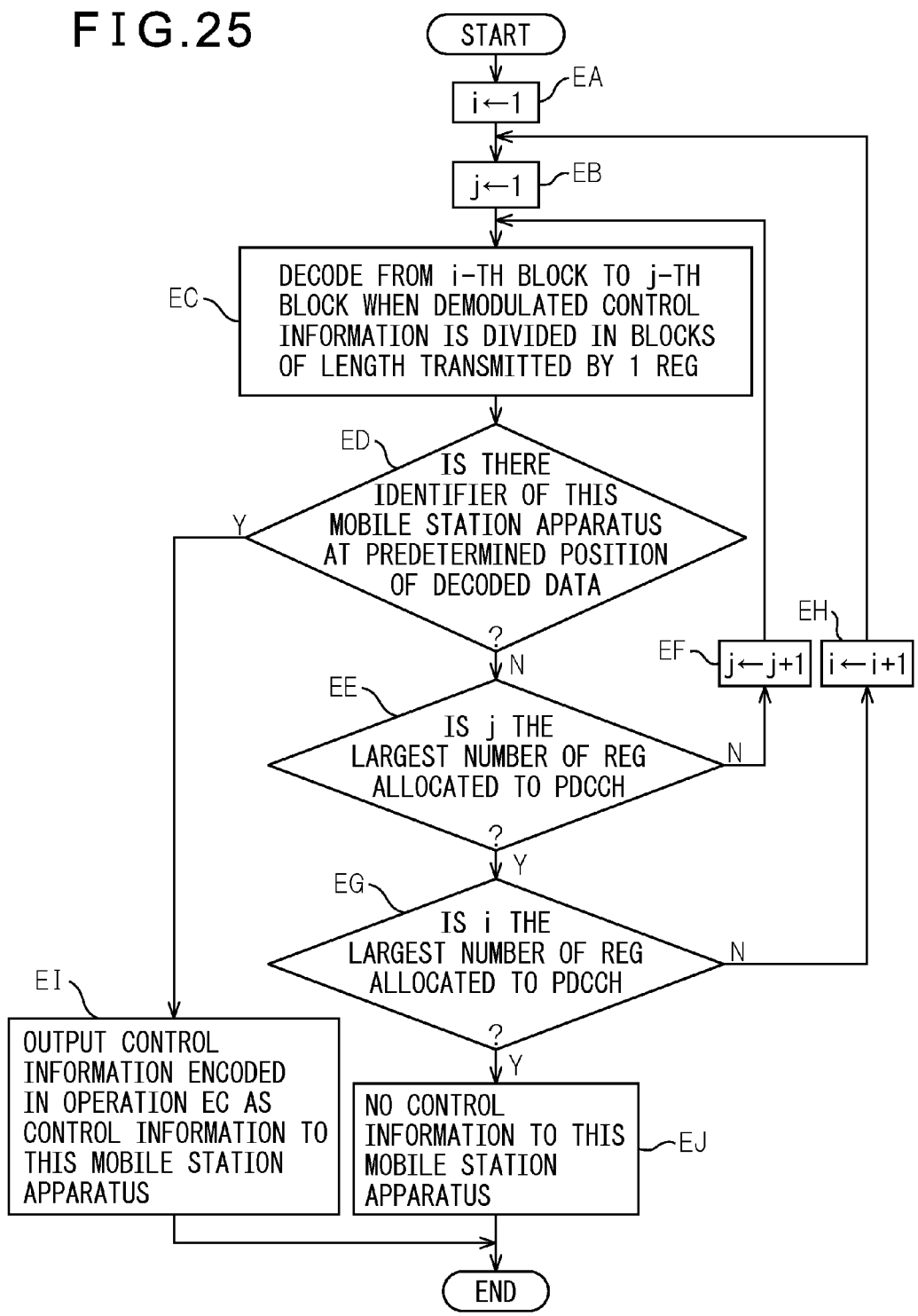

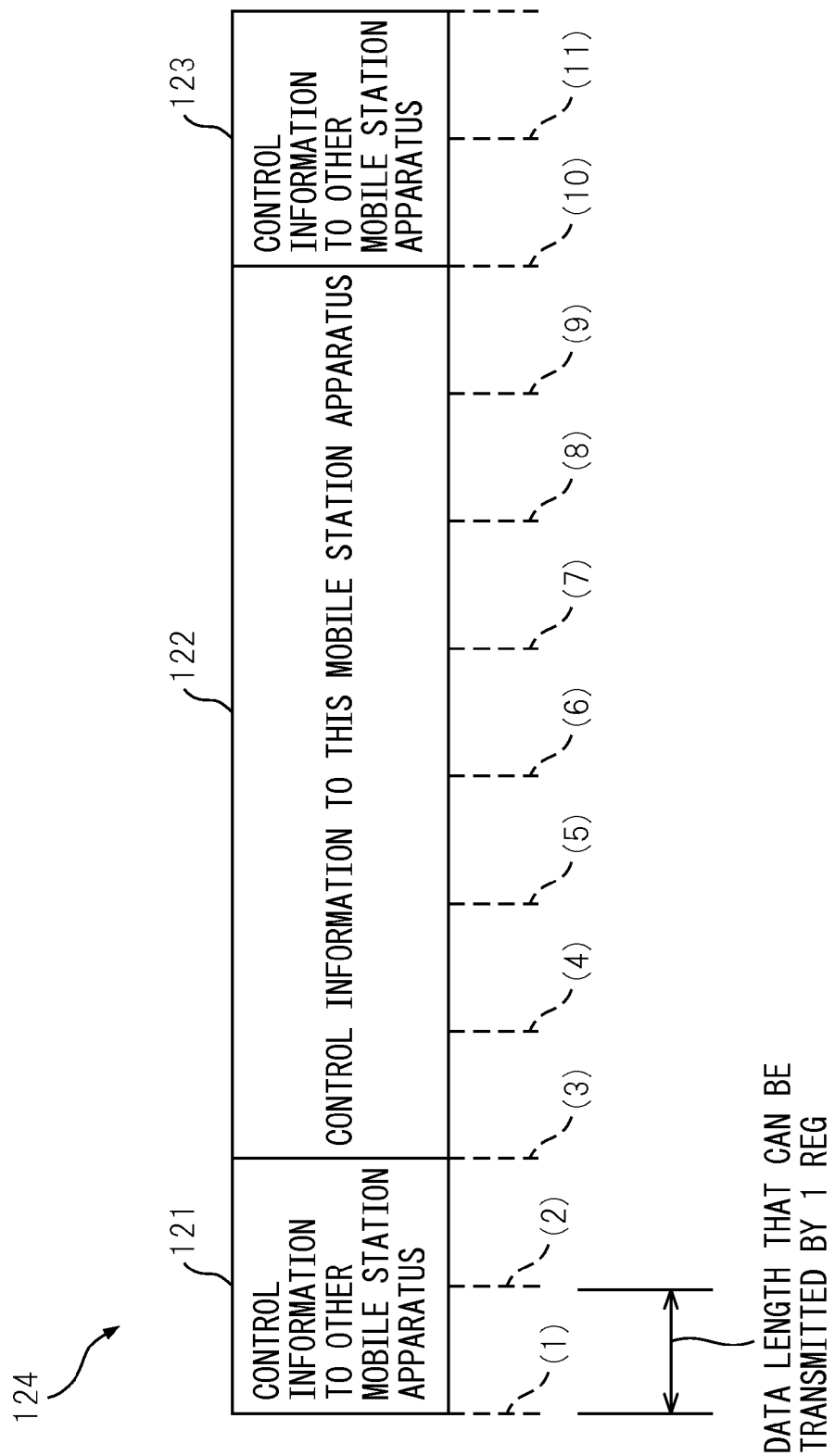

COMMUNICATION APPARATUS, BASE STATION APPARATUS, MOBILE STATION APPARATUS, COMMUNICATION SYSTEM AND COMMUNICATION METHOD

CROSS-REFERENCE TO RELATED APPLICATIONS

The present application is a continuation application based on International application No. PCT/JP2009/064951, filed on Aug. 27, 2009, the entire contents of which are incorporated herein by reference.

FIELD

Embodiments described in the present specification relate to the technology for allocating wireless resource to physical control channels.

BACKGROUND

An example of the conventional method for allocating wireless resource to physical control channels is described below using PDCCH Physical Downlink Control Channel) as an example. PDCCH is a physical control channel used in LTE (Long Term Evolution), i.e., the communication method being considered in 3GPP ($3^{rd}$ Generation Partnership Project).

FIG. 1 is a view illustrating the configuration of a conventional communication apparatus. Reference numeral 200 denotes a base station apparatus, reference numeral 201 denotes an information assembling unit, reference numeral 202 denotes an encoding unit, and reference numeral 203 denotes a modulation unit. Reference numeral 204 denotes an amplifier, and reference numeral 205 denotes an antenna.

Reference numeral 211 denotes a DCI (Downlink Control Information) assembling unit, reference numeral 212 denotes a PDCCH signal assembling unit, reference numeral 213 denotes a scrambler, reference numeral 214 denotes a quadrature modulator, and reference numeral 215 denotes an interleaver. The quadrature modulator 214 is a phase shift modulator or a quadrature amplitude modulator, for example. In the description that follows, the term "quadrature modulation" includes both phase shift modulation and quadrature amplitude modulation.

Reference numeral 216 denotes a cyclic shift unit, reference numeral 217 denotes a resource element (RE) mapping unit, reference numeral 218 denotes an inverse Fourier transformation unit (IFFT) and reference numeral 219 denotes a cyclic prefix (CP) insertion unit.

The base station apparatus 200 includes the information assembling unit 201, the encoding unit 202, the modulation unit 203, the amplifier 204, and the antenna 205. The information assembling unit 201 includes the DCI assembling unit 211.

To the DCI assembling unit 211, DCI payload including Downlink Control Information (DCI) and DCI format identifying information are inputted. DCI payload has been generated in a plurality of different formats, and a format of each DCI payload is identified by using the DCI format identifying information. The DCI assembling unit 211 assembles DCI signal by combining DCI payloads in accordance with the DCI format identifying information for each DCI payload.

FIG. 2A and FIG. 2B respectively depict DCI payloads that are inputted to the DCI assembling unit 211. Reference numerals 220 to 222 denote 3 different DCI payloads each generated in a first DCI format, and reference numerals 223 to 225 denote DCI payloads each generated in a second DCI format. FIG. 2C depicts DCI signal that is assembled by combining the DCI payloads 220 to 222 by the DCI assembling unit 211. FIG. 2D depicts DCI signal that is assembled by combining the DCI payloads 223 to 225 by the DCI assembling unit 211.

Referring to FIG. 1, the DCI assembling unit 211 outputs the generated DCI signal to the encoding unit 202. The encoding unit 202 encodes the DCI signal in accordance with PDCCH format information. FIG. 2E depicts the encoded DCI signal that has been generated by encoding of the DCI signal of FIG. 2C by the encoding unit 202. FIG. 2F depicts the encoded DCI signal that has been generated by encoding of the DCI signal of FIG. 2D by the encoding unit 202.

The PDCCH format information designates the data length of data to which the DCI signal is to be encoded. CCE (Control Channel Element) is used as unit of data length for the PDCCH format information to designate data length after encoding. It is assumed that DCI signals after encoding as depicted in FIG. 2E and FIG. 2F have data length corresponding to 1 CCE and 2 CCE, respectively.

1 CCE corresponds to the number of symbols transmitted by 9 Resource Element Group (REG). In the description that follows, Resource Element Group may be referred to as "REG".

REG is unit of wireless resource in mapping control information to wireless resource, and 1 REG includes 4 Resource Elements (RE). 1 Resource Element is a wireless resource that uses 1 subcarrier in 1 Basic Time Unit.

Referring to FIG. 1, the DCI signal that has been encoded by the encoding unit 202 is modulated to OFDM signal by the modulation unit 203. The amplifier 204 amplifies the OFDM signal, and the amplified OFDM signal is transmitted from the antenna 205.

The modulation unit 203 includes the PDCCH signal assembling unit 212, the scrambler 213, the quadrature modulator 214, the interleaver 215, and the cyclic shift unit 216. The modulation unit 203 further includes the resource element mapping unit 217, the inverse Fourier transformation unit 218, and the cyclic prefix insertion unit 219.

The PDCCH signal assembling unit 212 combines the encoded DCI signals encoded by the encoding unit 202. For convenience of simple description of the invention, data that are generated by the PDCCH signal assembling unit 212 by combining the encoded DCI signals will be hereinafter referred to as "PDCCH data", and the DCI signal encoded by the encoding unit 202 will be referred to as "coded data".

The PDCCH signal assembling unit 212 determines the starting position for storing the coded data in the PDCCH data by the terminal identifier of the destination mobile station apparatus to which the coded data are to be transmitted. As the starting position for storing the coded data in the PDCCH data, a position shifted by 1 CCE has been designated in advance. In accordance with designation of CCE number that determines the starting position corresponding to the terminal identifier of the destination mobile station apparatus, the PDCCH signal assembling unit 212 stores the coded data to a position corresponding to the designated CCE number.

FIG. 2G illustrates an example of PDCCH data generated by the PDCCH signal assembling unit 212. The number in the parenthesis below the rectangle depicting PDCCH data is CCE number that designates the starting position for storing the coded data in the PDCCH data. In the example illustrated in FIG. 2G, the coded data 228 depicted in FIG. 2E are stored in a region of 1 CCE in length starting from the CCE number 7, and the coded data 227 depicted in FIG. 2F are stored in a region of 2 CCE in length starting from the CCE number 3.

The PDCCH signal assembling unit 212 inserts NIL data into a region of PDCCH data where there is no coded data to be stored so as to indicate that the region is empty. In the example depicted in FIG. 2G, NIL data are inserted into the regions of CCE number 1 and 2. In REG where NIL data are mapped, no valid data are transmitted.

Referring to FIG. 1, the scrambler 213 scrambles the PDCCH data in a scramble sequence proper to the base station 200. The quadrature modulator 214 generates a quadrature modulated signal by quadrature modulation of the scrambled PDCCH data.

The interleaver 215 performs an interleave processing on the quadrature modulated signal that is outputted from the quadrature modulator 214 in unit of symbols transmitted in 1 REG. The cyclic shift unit 216 imparts a cyclic shift to the quadrature modulated signal after interleave processing.

FIG. 3A depicts the PDCCH data depicted in FIG. 2G after processing by the scrambler 213, the quadrature modulator 214, the interleaver 215 and the cyclic shift unit 216. FIG. 3A indicates that data representing the information included in the coded data 228 depicted in FIG. 2G are stored in the portion denoted by reference numeral 230, and data representing the information included in the coded data 227 are stored in the portion denoted by reference numeral 231. NIL data are stored in the portions denoted by reference numerals 232 and 233.

Referring to FIG. 1, the resource element mapping unit 217 maps the data of FIG. 3A having cyclic shift imparted thereto to various resource elements. The number of OFDM (Orthogonal Frequency Division Multiplexing) symbols is designated by the value of CFI (control format indicator) transmitted by PCFICH (Physical Control Format Indicator Channel). FIG. 3B illustrates a state in which CFI is 3 and data in FIG. 3A are mapped to various resource elements by the resource element mapping unit 217. As illustrated in FIG. 3B, NIL data stored in data of FIG. 3A are mapped to several resource elements.

Referring to FIG. 1, the resource element mapping unit 217 maps control information, and at the same time maps main signal to resource elements. Description of the processing of the main signal is omitted.

The inverse Fourier transformation unit 218 generates OFDM signal by inverse Fourier transformation of the symbol that is mapped to each resource element. The cyclic prefix insertion unit 219 inserts a cyclic prefix to the OFDM signal.

As has been described above, the coded data after being encoded by the encoding unit 202 have a length that is an integral multiple of CCE, where 1 CCE includes 9 REG. Thus, NIL data are stored in the remainder obtained by dividing a total number of REG allocated for mapping of PDCCH by 9.

For example, a case where PDCCH is mapped only to a first OFDM symbol will be illustrated below. A number of subcarriers for 1 OFDM symbol is assumed to be 300, and PCFICH is assumed to use 4 REG, and PHICH (Physical Hybrid ARQ Indicator Channel) is assumed to use 3 REG. PHICH is a channel for transmitting retransmission control signal of uplink hybrid ARQ (Automatic repeat-request).

Since, in the first OFDM symbol, 6 subcarriers are allocated to 1 REG, there are 50 REGs in the first OFDM symbol. Therefore, number of REGs that can be allocated to PDCCH is 50−(4+3)=43. Since the remainder of 43 divided by 9 is 7, no control information is allocated to the 7 REGs, and NIL data are inserted to the 7 REGs.

The PDCCH signal assembling unit 212 stores coded data in accordance with CCE number defined by the terminal identifier of the destination mobile station apparatus. Thus, a gap may be produced between coded data stored in PDCCH data, and NIL data are also inserted in such a gap.

Since no valid data are transmitted in REG having NIL data mapped thereto, the larger the number of REG having NIL data mapped thereto, the lower is the utilization efficiency of wireless resource.

A wireless terminal apparatus has been proposed in which, in downlink from a wireless base station apparatus to wireless terminal apparatuses, PCFICH is arranged from starting subcarrier of the first OFDM symbol in a sub-frame, and ACK/NACK (ACK/NACK for UL) signal for uplink from wireless terminal apparatuses to the wireless base station apparatus is blocked and multiplexed in frequency domain so that ACK/NACK signal and PDCCH are multiplexed using frequency division multiplexing and time division multiplexing.

User equipment for wireless communication with the base station apparatus in a mobile communication system has also been proposed. Such a user equipment includes a receiver unit for receiving a first shared channel in a downlink, a transmission unit for transmitting arrival acknowledgement information and a second shared channel in an uplink. In uplink signal that requires no arrival acknowledgement information, mapping of the second shared channel to the bit region for arrival acknowledgement information is forbidden.

DISCLOSURE OF INVENTION

A communication apparatus according to an embodiment includes a number-of-units determination unit that determines the number of resource units to be allocated to plural physical channels by proportionally dividing total number of resource units included in the wireless resource designated for mapping of physical control channels among the plural physical control channels in accordance with a predetermined rule, an encoding unit that encodes the control information to be respectively transmitted on the plural physical channels to data whose length allows it to be transmitted by the number of resource units determined by the number-of-units determination unit, a modulation unit that modulates the encoded control information and a transmission unit that transmits the signal modulated by the modulation unit.

The objects and advantages of the present invention are realized and attained with the elements in particular as depicted in the appended claims. Both general description as disclosed above and detailed description that follows are to be construed only as examples and illustrations and not as limitation to the present invention that is defined only by the appended claims.

BRIEF DESCRIPTION OF THE DRAWINGS

FIG. 2G is a view (part 7) illustrating the conventional method for allocating wireless resource.

FIG. 19 is a view illustrating a correspondence table between CQI value and weighting coefficient.

FIG. 20 is a view illustrating the result of calculation of allocated number of REGs.

FIG. 22A is a view (part 8) illustrating a method of allocating REGs to downlink physical control channels.

FIG. 22B is a view (part 9) illustrating a method of allocating REGs to downlink physical control channels.

FIG. 25 is a view illustrating the decoding processing by the mobile station apparatus illustrated in FIG. 13.

FIG. 26 is a view illustrating an example of signal over a downlink physical control channel received by the mobile station apparatus illustrated in FIG. 13.

DESCRIPTION OF EMBODIMENTS

In the conventional method for allocating wireless resource to physical control channels, among wireless resource designated for mapping physical control channel, there may arise some wireless resource to which no valid signal is mapped. Thus, there is a problem that utilization efficiency of wireless resource may be thereby lowered.

The apparatus and method according to the present embodiment aim to improve the utilization efficiency of wireless resource designated for mapping of physical control channels.

Figure 4:
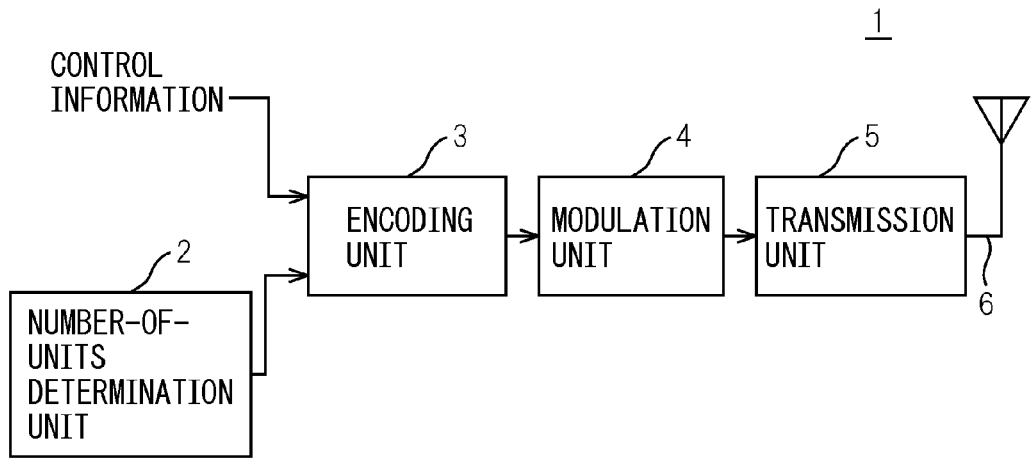
FIG. 4 is a view illustrating the configuration of a first embodiment of the communication apparatus.

Preferred embodiments will be described below with reference to appended drawings. FIG. 4 is a view illustrating the configuration of a communication apparatus according to a first embodiment. Reference numeral 1 denotes a communication apparatus, reference numeral 2 denotes a number-of-units determination unit, reference numeral 3 denotes an encoding unit, reference numeral 4 denotes a modulation unit, reference numeral 5 denotes a transmission unit, and reference numeral 6 denotes an antenna. The communication apparatus 1 includes the number-of-units determination unit 2, the encoding unit 3, the modulation unit 4, the transmission unit 5 and the antenna 6.

The number-of-units determination unit 2 determines the number of resource units allocated to each of a plurality of physical control channels by proportionally dividing the total number of resource units included in the wireless resource designated for mapping of physical control channels among the plural physical control channels in accordance with a predetermined rule.

Any wireless resource that uses any number of subcarriers in any number of basic time units may be defined as a resource unit. A size of one resource unit may be such that the size of the total wireless resource designated for mapping of physical control channels can be divided by it. A resource unit may be, for example, the REG that is defined as the wireless resource unit in LTE for mapping the control information to wireless resource.

The above-described predetermined rule that is used by the number-of-units determination unit 2 to proportionally divide a total number of resource units provided for mapping of physical control channels among a plurality of physical control channels may be any rule. In order to improve utilization efficiency of wireless resource designated for mapping of physical control channels, it is sufficient that a total number of resource units are allocated among physical control channels, and improvement of utilization efficiency of the wireless resource can be attained irrespective of the rule adopted for determining the proportion of the division.

As an example of the predetermined rule described above, for example, the number-of-units determination unit 2 may divide the total number of resource units equally by the number of the plurality of physical control channels or the number-of-units determination unit 2 may proportionally divide total number of resource units, for example, in accordance with the data amount of control information transmitted respectively on the plurality of physical control channels. By proportionally dividing total number of resource units in accordance with the data amount of control information, variation of coded rate among channels can be reduced so that occurrence of channels of remarkably poor communication quality compared to other channels can be avoided.

Further, the number-of-units determination unit 2 may proportionally divide the total number of resource units, for example, in proportion to the data amount of control information transmitted over the plurality of physical control channels, with data amount weighted by respective line quality of the physical control channels. By determining the number of allocated resource units so as to take line quality into account, coded rate of control information transmitted over channels of poor line quality can be lowered.

The encoding unit 3 encodes the control information transmitted respectively on plural physical control channels into data of length that can be transmitted by the number of resource units determined by the number-of-units determination unit 2. The modulation unit 4 modulates the encoded control information. The transmission unit 5 transmits the signal modulated by the modulation unit 4 via the antenna 6.

Figure 5:
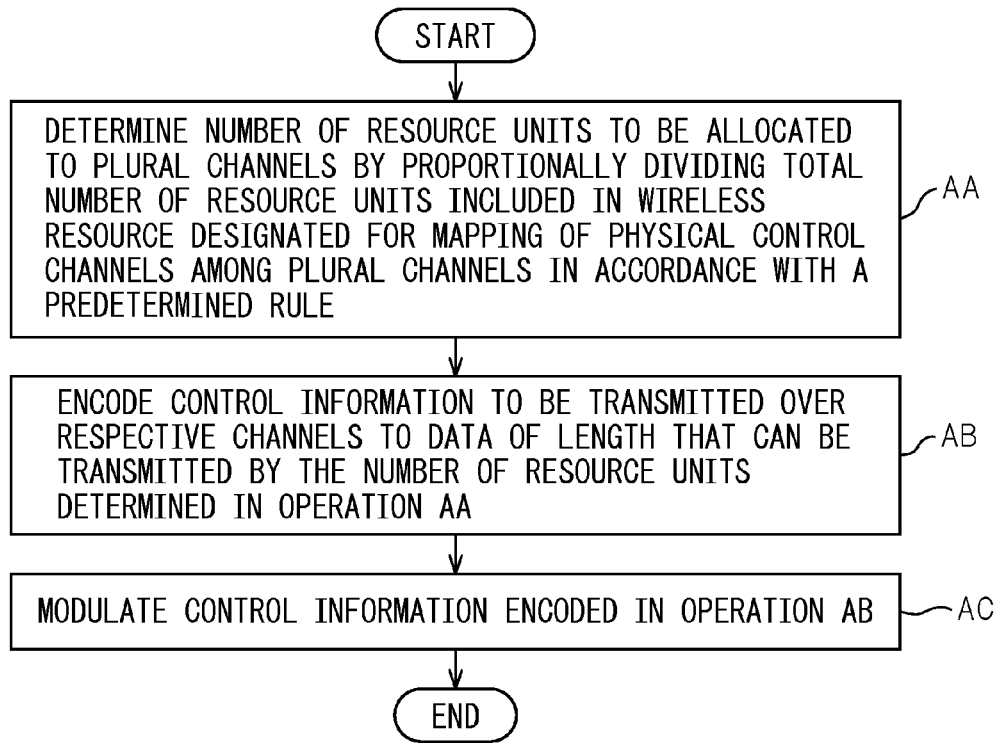
FIG. 5 is a view (part 1) illustrating an embodiment of the method for allocating wireless resource.

FIG. 5 is a view (part 1) useful for illustrating an embodiment of the method of allocating wireless resource. In another embodiment, each of the following operations AA to AC may be a step.

In operation AA, the number-of-units determination unit 2 determines the number of resource units allocated respectively to plural physical control channels by proportionally dividing the total number of resource units included in the wireless resource designated for mapping of physical control channels among the plural physical control channels in accordance with a predetermined rule.

In operation AB, the encoding unit 3 encodes the control information transmitted respectively over the plural physical control channels to data of length that can be transmitted in the number of resource units determined in operation AA.

In operation AC, the modulation unit 4 modulates the control information encoded in operation AB. The transmission unit 5 transmits the modulated signal via the antenna 6.

In the present embodiment, total number of resource units provided for mapping of physical control channels are divided among various physical control channels and used for mapping so that improvement of utilization efficiency of the wireless resource can be attained. Since, with the present embodiment, utilization efficiency of the wireless resource is improved, it is possible to lower coded rate of physical control channels, and successful reception rate of control information can be improved.

Figure 6:
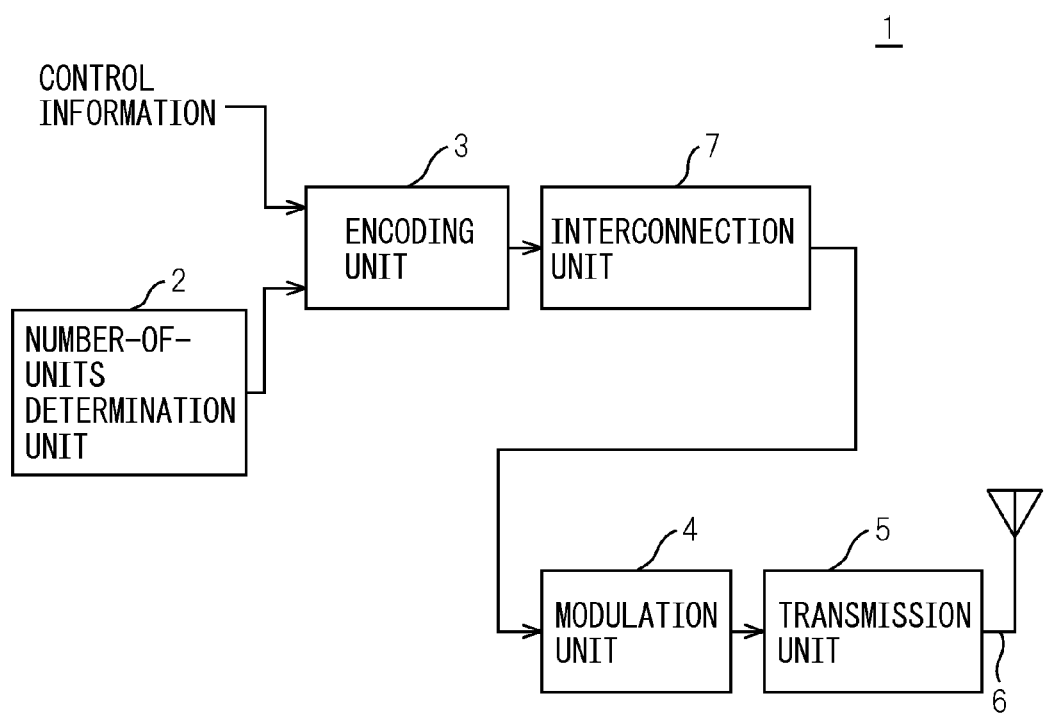
FIG. 6 is a view illustrating the configuration of a second embodiment of the communication apparatus.

FIG. 6 is a view illustrating the configuration of a second embodiment of communication apparatus. Reference numeral 7 denotes an interconnection unit. Constituents similar to the constituents illustrated in FIG. 4 are denoted by same reference numerals as those used in FIG. 4. The communication apparatus 1 includes a number-of-units determination unit 2, an encoding unit 3, an interconnection unit 7, a modulation unit 4, a transmission unit 5, and an antenna 6.

Figure 7:
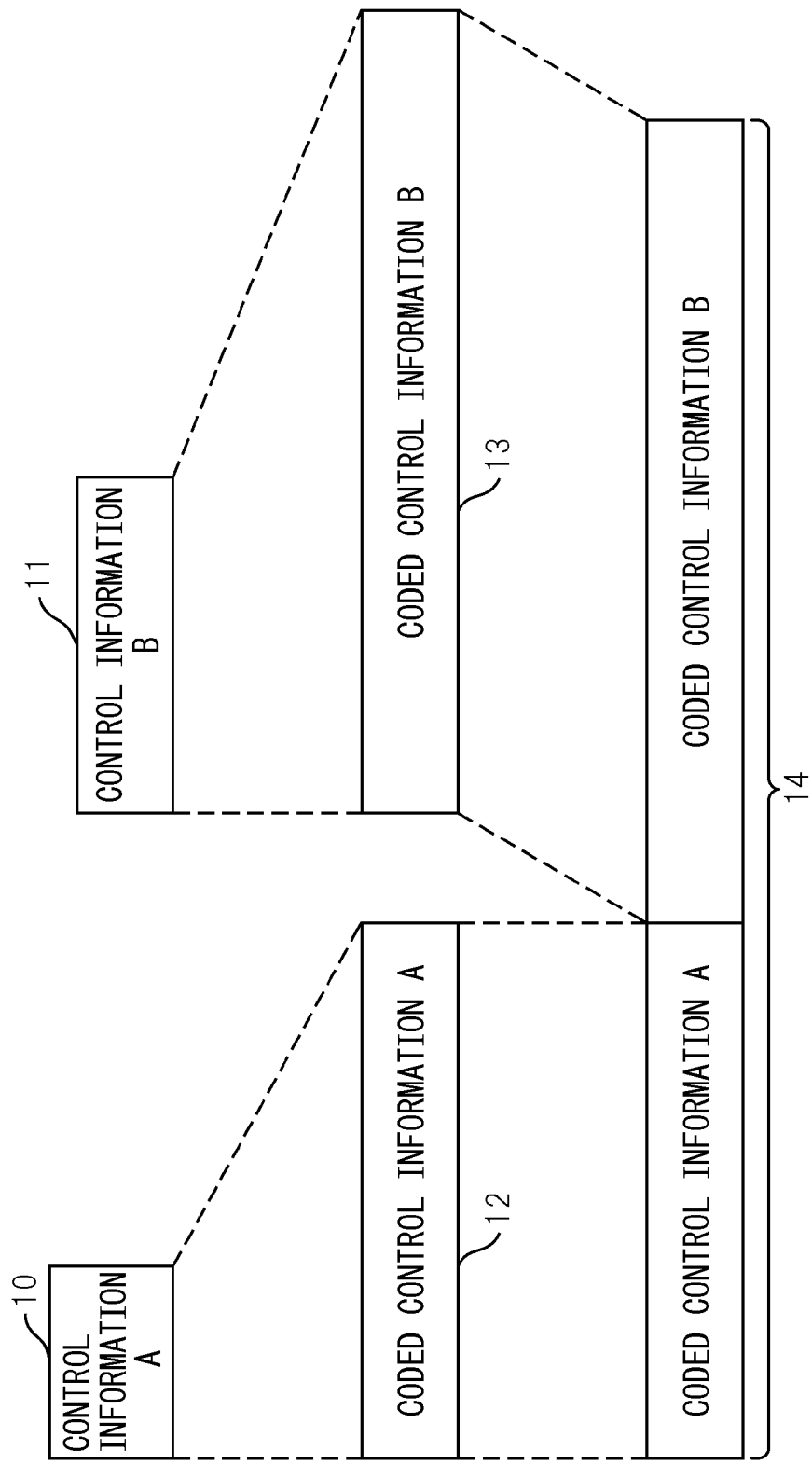
FIG. 7 is a view (part 2) illustrating an embodiment of the method for allocating wireless resource.

The interconnection unit 7 interconnects a series of control information encoded by the encoding unit 3 continuously, and supplies it to the modulation unit 4. FIG. 7 is a view (part 2) illustrating an embodiment of the method for allocating wireless resource. Reference numeral 10 and 11 denote examples of control information before encoding by the encoding unit 3. Reference numerals 12 and 13 respectively denote the control information obtained after encoding of the control information 10 and 11 by the encoding unit 3.

As denoted by reference numeral 14, the interconnection unit 7 interconnects the encoded control information 12 and 13 continuously, and supplies it to the modulation unit 4. The modulation unit 4 maps the continuously interconnected control information 12 and 13 interconnected without gap to wireless resource.

Figure 8:
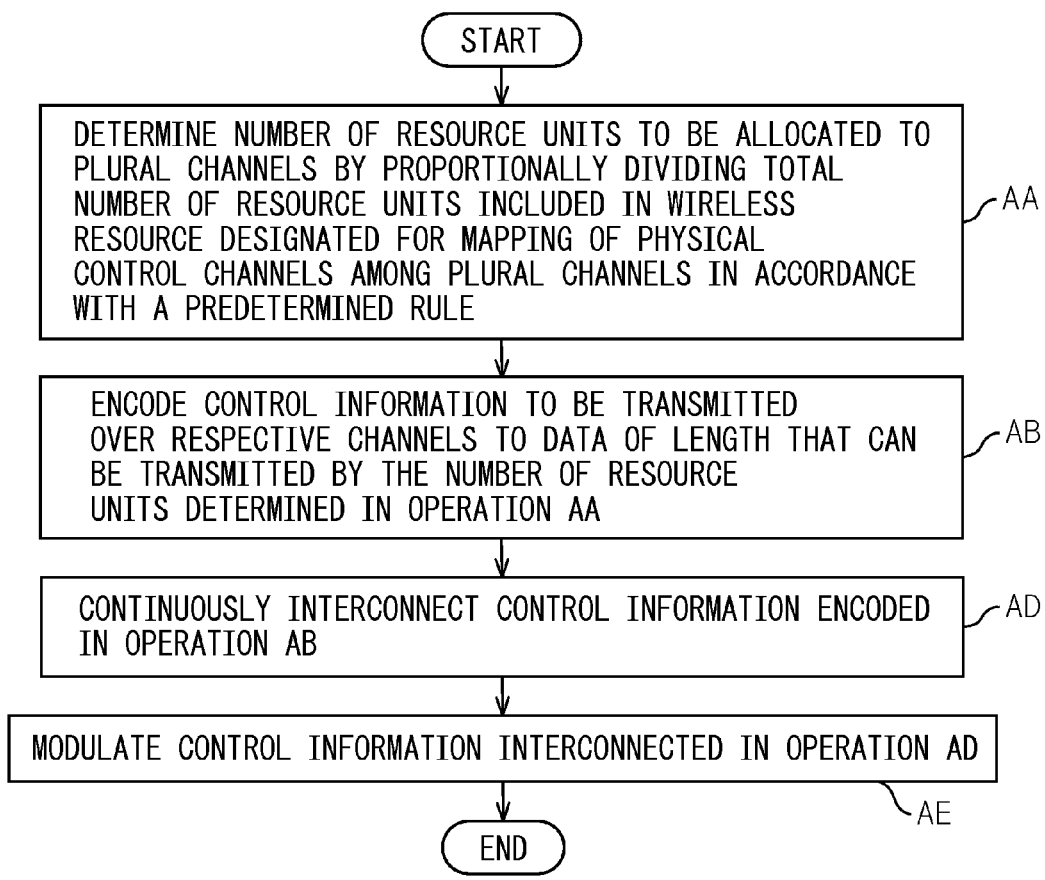
FIG. 8 is a view (part 3) illustrating an embodiment of the method for allocating wireless resource.

FIG. 8 is a view (part 3) useful for illustrating an embodiment of the method of allocating wireless resource. In another embodiment, each of the following operations AA, AB, AD and AE may be a step.

Processing in operations AA and AB is respectively the same as the processing in operations AA and AB described above with reference to FIG. 5. In operation AD, as denoted by reference numeral 14, the interconnection unit 7 continuously interconnects the plural control information encoded in operation AB, and supplies it to the modulation unit 4. In operation AE, the modulation unit 4 modulates the control information continuously interconnected in operation AD, and maps the control information to wireless resource.

In accordance with the present embodiment, in the control information mapped to wireless resource by the modulation unit 4, no gap is produced in which empty data is inserted, so that occurrence of wireless resource with no data mapped thereto can be avoided.

Figure 9:
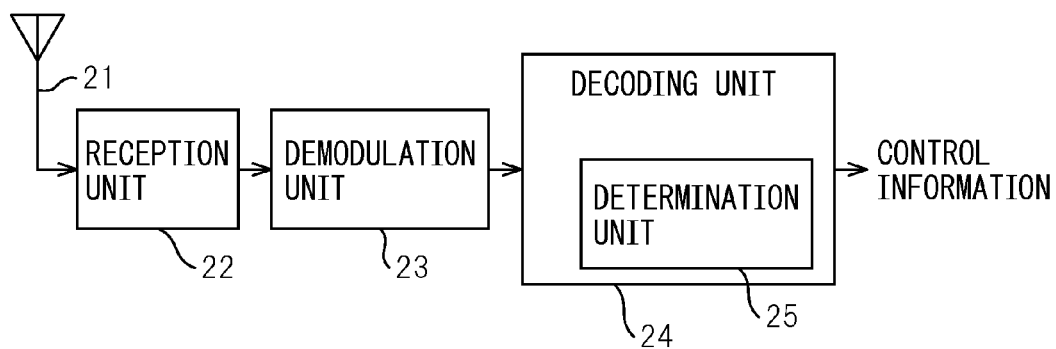
FIG. 9 is a view illustrating the configuration of a third embodiment of the communication apparatus.

FIG. 9 is a view illustrating the configuration of a third embodiment of communication apparatus. Reference numeral 20 denotes a communication apparatus, reference numeral 21 denotes an antenna, reference numeral 22 denotes a reception unit, reference numeral 23 denotes a demodulation unit, reference numeral 24 denotes a decoding unit, and reference numeral 25 denotes a determination unit.

The communication apparatus 20 includes the antenna 21, the reception unit 22, the demodulation unit 23, the decoding unit 24 and the determination unit 25. The determination unit 25 may be a part of the function of the decoding unit 24, or may be a separate component other than the decoding unit 24.

The communication apparatus 20 is a communication apparatus that uses the control information transmitted from the communication apparatus described above with reference to FIG. 6. The reception unit 22 receives via the antenna 21 the control information that is transmitted from the communication apparatus 1. The demodulation unit 23 demodulates the received signal and reproduces a signal in the state inputted from the interconnection unit 7 to the modulation unit 4 of the communication apparatus 1.

The decoding unit 24 decodes the control information demodulated by the demodulation unit 23, and reproduces the control information before encoding. The determination unit 25 determines whether or not control information addressed to this communication apparatus 20 is included in the decoded control information.

An example of determination processing to determine whether or not control information addressed to this communication apparatus 20 is included in the decoded control information, will be described below. Control information may include an identifier of the destination communication apparatus in order to determine whether or not the decoded control information includes the control information addressed to this communication apparatus 20.

Figure 10:
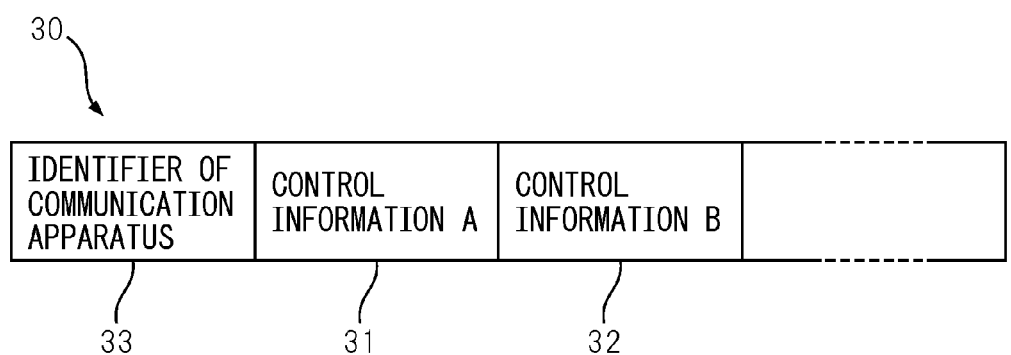
FIG. 10 is a view illustrating the format of control information transmitted to the communication apparatus illustrated in FIG. 9.

FIG. 10 is a view illustrating the format of the control information transmitted to the communication apparatus as illustrated in FIG. 9. FIG. 10 depicts the control information before being encoded by encoding unit 3. An example of the control information 30 depicted in FIG. 10 includes plural control information 31 and 32 transmitted simultaneously to some communication apparatuses. The control information 30 also includes an identifier 33 of the destination communication apparatus of the control information 30.

The determination unit 25 cannot determine whether or not the identifier 33 of the communication apparatus is included in the encoded identifying information. The decoding unit 24 reads out partial data starting from different positions and having different lengths, respectively, from the demodulated data before decoding that are outputted from the demodulation unit 23. At this time, the decoding unit reads out the partial data at different position and of different length, respectively, from data before decoding by varying the starting position and data length for reading out data. The determination unit 25 determines whether or not the identifier of the communication apparatus 20 is included in the control information obtained by decoding respective partial data by decoding unit 24.

Figure 11:
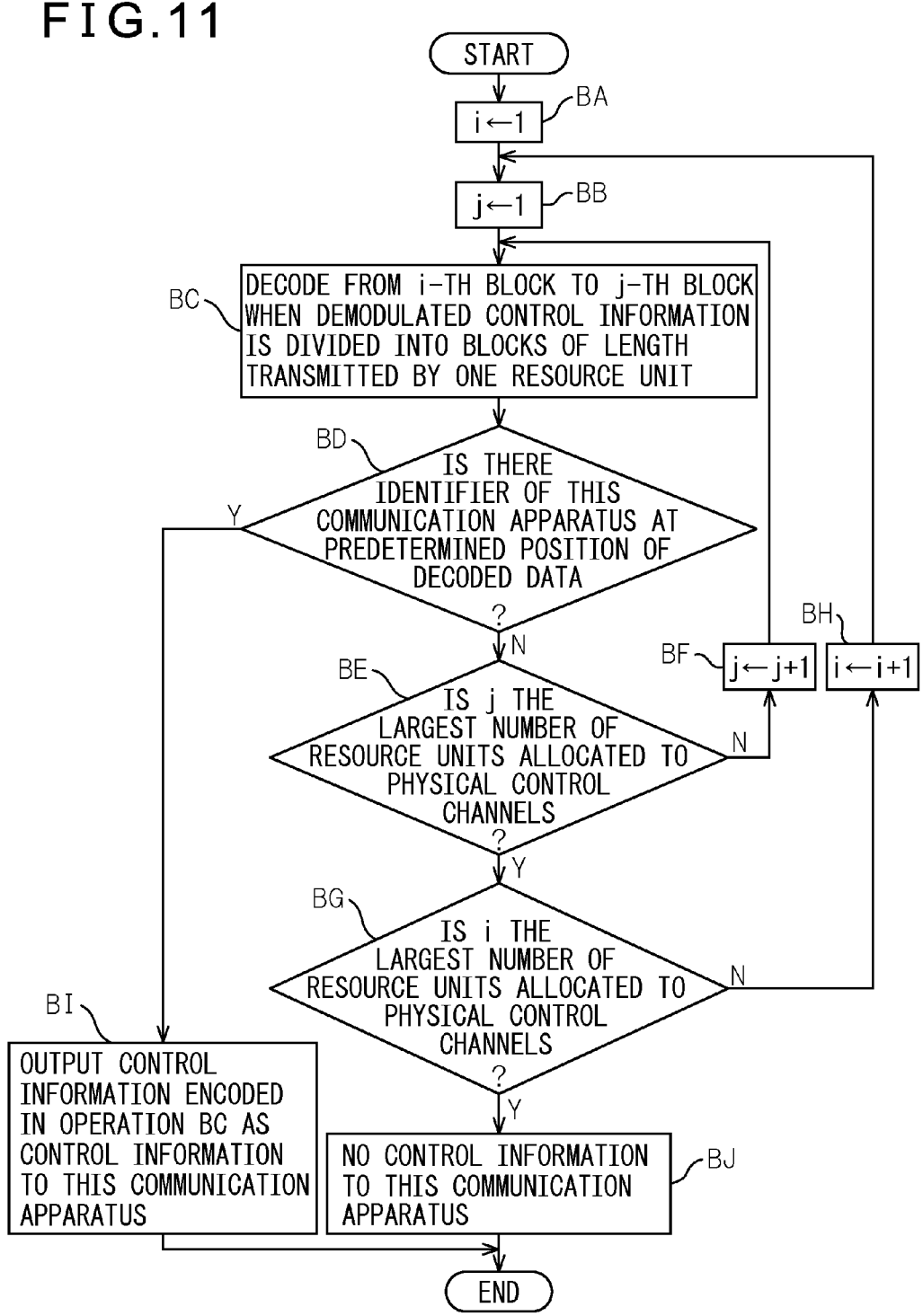
FIG. 11 is a view (part 1) illustrating the decoding processing by the communication apparatus illustrated in FIG. 9.

FIG. 11 is a view illustrating decoding processing performed by the communication apparatus illustrated in FIG. 9. Each of operations BA to BJ in FIG. 11 may be a step. In operations BA and BB, the decoding unit 24 substitutes a value "1" into the variable i, and the value of the variable i into the variable j.

In operation BC, the decoding unit 24 decodes the partial data read out from the demodulated control information before decoding demodulated by the demodulation unit 23. At this time, the unit of data length when the partial data are read out by the decoding unit 24 from the control information demodulated by the demodulation unit 23 is equal to the data length that can be transmitted by one resource unit. That is, the partial data read out has a length that is an integral multiple of the data length that can be transmitted by one resource unit.

The decoding unit 24 selects the starting position from among plural predetermined candidate readout starting positions for reading out the partial data from the demodulated control information. Separation of the candidate readout starting positions for reading out the partial data is equal to the data length that can be transmitted by one resource unit, and the first candidate readout starting position is the same as the top position of the demodulated control information.

Figure 12:
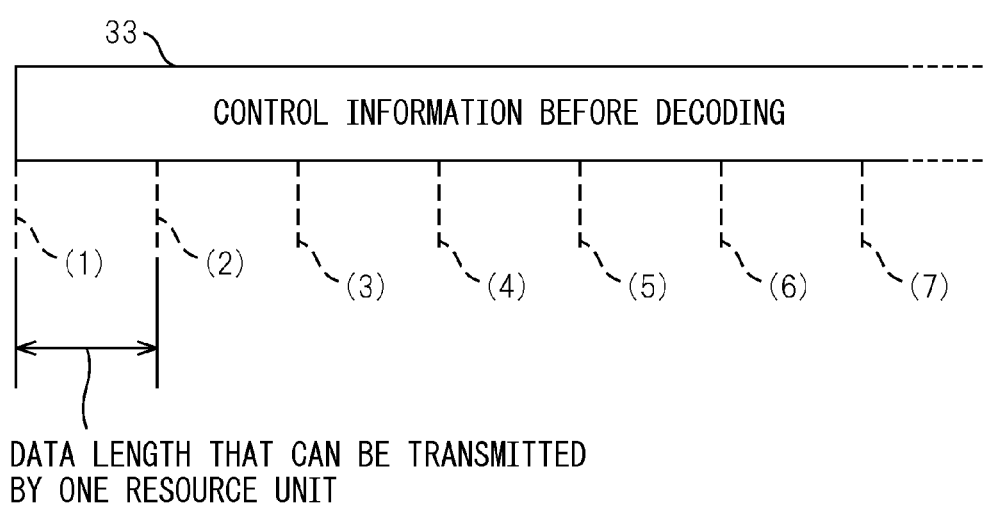
FIG. 12 is a view (part 2) illustrating the decoding processing by the communication apparatus illustrated in FIG. 9.

FIG. 12 illustrates the candidate readout starting positions thus defined. Reference numeral 33 denotes demodulated control information before decoding demodulated by the demodulation unit 23. Plural dashed lines depicted below the control information 33 respectively illustrate the candidate readout starting positions. The number in the parenthesis represents the numerical order of each candidate readout starting position counted from the first candidate readout starting position. The separation between adjoining dashed lines is the data length that can be transmitted by one resource unit, and is equal to the unit of data length for reading out partial data from the control information 33 before decoding.

In other words, unit of partial data read out by the decoding unit 24 from the control information 33 is a block obtained when the control information 33 is divided into blocks of data length that can be transmitted by one resource unit. The candidate starting positions for the decoding unit 24 to read out partial data from the control information 33 are respective starting position of these blocks.

In operation BC, the decoding unit 24 reads out partial data from a block starting from i-th candidate starting position to a block starting from j-th candidate readout starting position, and decodes the partial data.

In operation BD, the determination unit 25 determines whether or not the identifier of this communication apparatus 20 is stored at a predetermined position of the control information decoded in the operation BC. If the decoded partial data coincides with the control information addressed to this communication apparatus 20, the identifier of this communication apparatus 20 is included in the decoded control information (operation BD: Y). If the identifier of this communication apparatus 20 is included in the decoded control information, the processing proceeds to operation BI.

If the decoded partial data does not coincide with the control information addressed to this communication apparatus 20, normal decoding has not been done or an identifier of other communication apparatus is included (operation BD: N). If the identifier of this communication apparatus 20 is not included in the decoded control information, the processing proceeds to operation BE.

In operation BE, the decoding unit 24 determines whether or not the variable j is the largest number of resource units included in the wireless resource designated for mapping of physical control channels. If the variable j is the largest number of resource units (operation BE: Y), the proceeding proceeds to operation BG. If the variable j is not the largest number of resource units (operation BE: N), the processing proceeds to operation BF. In operation BF, the decoding unit 24 increases the value of the variable by one, and returns the processing to operation BC.

In operation BG, the decoding unit 24 determines whether or not the variable i is the largest number of resource units included in the wireless resource designated for mapping of physical control channels. If the variable i is the largest number of resource units (operation BG: Y), the proceeding proceeds to operation BJ. If the variable i is not the largest number of resource units (operation BG: N), the processing proceeds to operation BH. In operation BH, the decoding unit 24 increases the value of the variable i by one, and returns the processing to operation BB.

If, in operation BC, the identifier of this communication apparatus 20 is included in the decoded identifying information, in operation BJ, the decoding unit 24 outputs the decoded control information to this communication apparatus 20 as the control information. Thereafter, the processing is terminated.

In operation BG, if the variable i reaches the largest number of resource units, it means that the decoding unit 24 has tried all the candidate starting positions and variations of data length for reading out. In operation BJ, the decoding unit 24 determines that control information for this communication apparatus 20 is not included in the received signal, and thereafter, the processing is terminated.

In accordance with the present embodiment, it is possible to determine whether or not the control information transmitted from the communication apparatus 1 of the embodiment described above with reference to FIG. 6 is the control information addressed to this communication apparatus 20.

Figure 13:
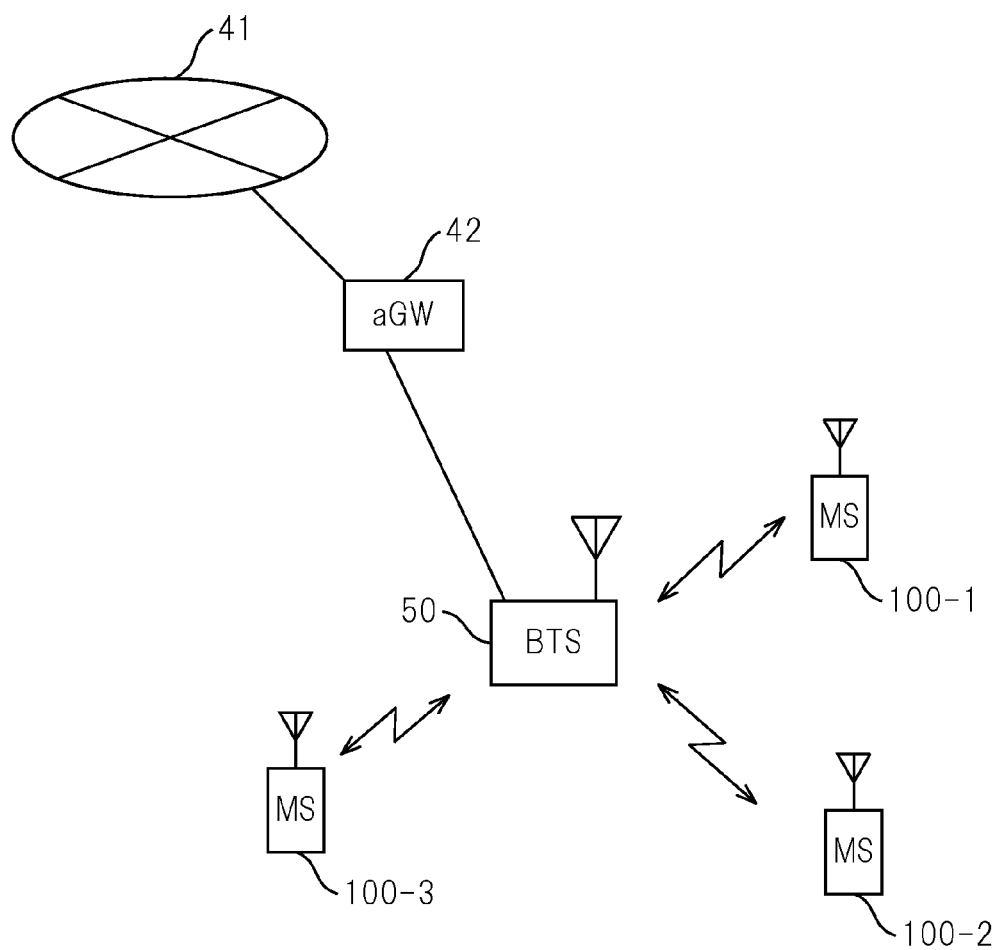
FIG. 13 is a view illustrating an embodiment of a communication system.

An embodiment in which wireless resource is allocated to PDCCH by applying the above-described method for allocating wireless resource will be illustrated below. FIG. 13 is a view illustrating an example of the configuration of a communication system. A communication system 40 is, for example, a communication system to which LTE is applied.

The aspect of the communication system 40 that will be described below is only an example. Thus, following description is not intended to limit the aspect of the communication system 40 to that described below. The communication system 40 may be a communication system that uses communication scheme other than LTE. The method for allocating wireless resource described above and below may be applied to allocation of channels other than PDCCH.

Reference numeral 41 denotes a core network, reference numeral 42 denotes an access Gate Way (aGW) apparatus, reference numeral 50 denotes a Base Transceiver Station (BTS) apparatus, and reference numerals 100-1 to 100-3 denote Mobile Station (MS) apparatuses. Mobile station apparatuses 100-1 to 100-3 may be generally referred to as mobile station apparatuses 100. The communication system 40 includes a base transceiver station apparatus 50 and plural mobile station apparatuses 100. The base transceiver station apparatus 50 is connected to a higher rank station, and the higher rank station is connected to the core network 41. The higher rank station may be an access gateway apparatus 42, for example.

Figure 14:
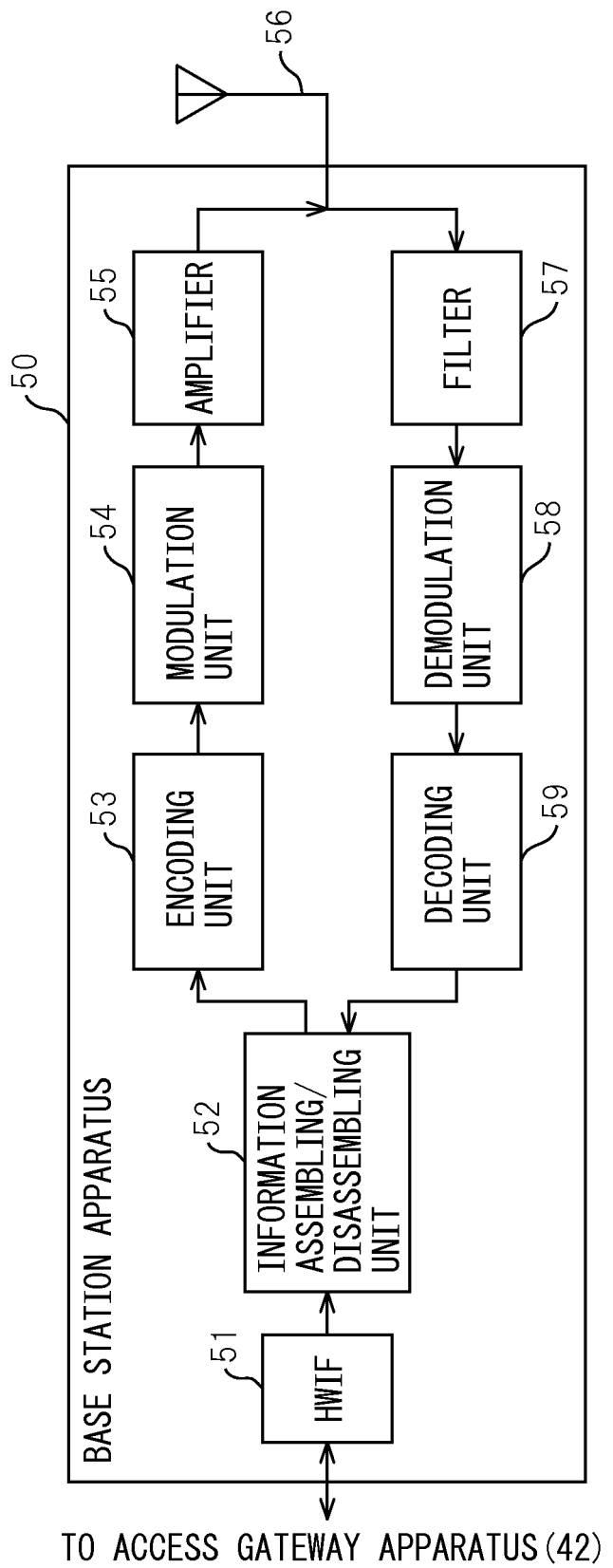
FIG. 14 is a view illustrating an example of the configuration of the base station apparatus illustrated in FIG. 13.

FIG. 14 is a view illustrating an example of the configuration of the base transceiver station apparatus depicted in FIG. 13. Reference numeral 51 denotes a highway interface (HWIF), reference numeral 52 denotes an information assembling/disassembling unit, reference numeral 53 denotes an encoding unit, reference numeral 54 denotes a modulation unit, and reference numeral 55 denotes an amplifier. Reference numeral 56 denotes an antenna, reference numeral 57 denotes a filter, reference numeral 58 denotes a demodulation unit, and reference numeral 59 denotes a decoding unit.

The base transceiver station apparatus 50 includes the highway interface 51, the information assembling/disassembling unit 52, the encoding unit 53, modulation unit 54, the amplifier 55, the antenna 56, the filter 57, the demodulation unit 58, and the decoding unit 59.

The highway interface 51 is connected to a higher rank station than the base transceiver station apparatus 50, for example, to the access gateway apparatus 42. Data transmitted from the base transceiver station apparatus 50 to a mobile station apparatus 100 are inputted via the highway interface 51 from the access gateway apparatus 42 to the base transceiver station apparatus 50. Data transmitted from a mobile station apparatus 100 to the base transceiver station apparatus 50 are outputted via the highway interface 51 from the base transceiver station apparatus to the access gateway apparatus 42.

The information assembling/disassembling unit 52 performs signal processing on baseband signal of user data and control information transmitted between the base transceiver station apparatus 50 and the mobile station apparatus 100. The encoding unit 53 encodes downlink channel signal generated by the information assembling/disassembling unit 52. The modulation unit 54 modulates the encoded signal encoded by the encoding unit 53, and generates OFDM signal. OFDM signal is amplified by the amplifier 55 and transmitted from the antenna 56.

The filter 57 limits the frequency bandwidth of uplink channel signal received from the mobile station apparatus 100 via the antenna 56. The demodulation unit 58 demodulates the uplink channel signal having bandwidth limited by the filter 57 to extract coded data. The decoding unit 59 performs decoding processing on the coded data extracted by the demodulation unit 58. The decoded baseband signal is inputted to the information assembling/disassembling unit 52.

Figure 15:
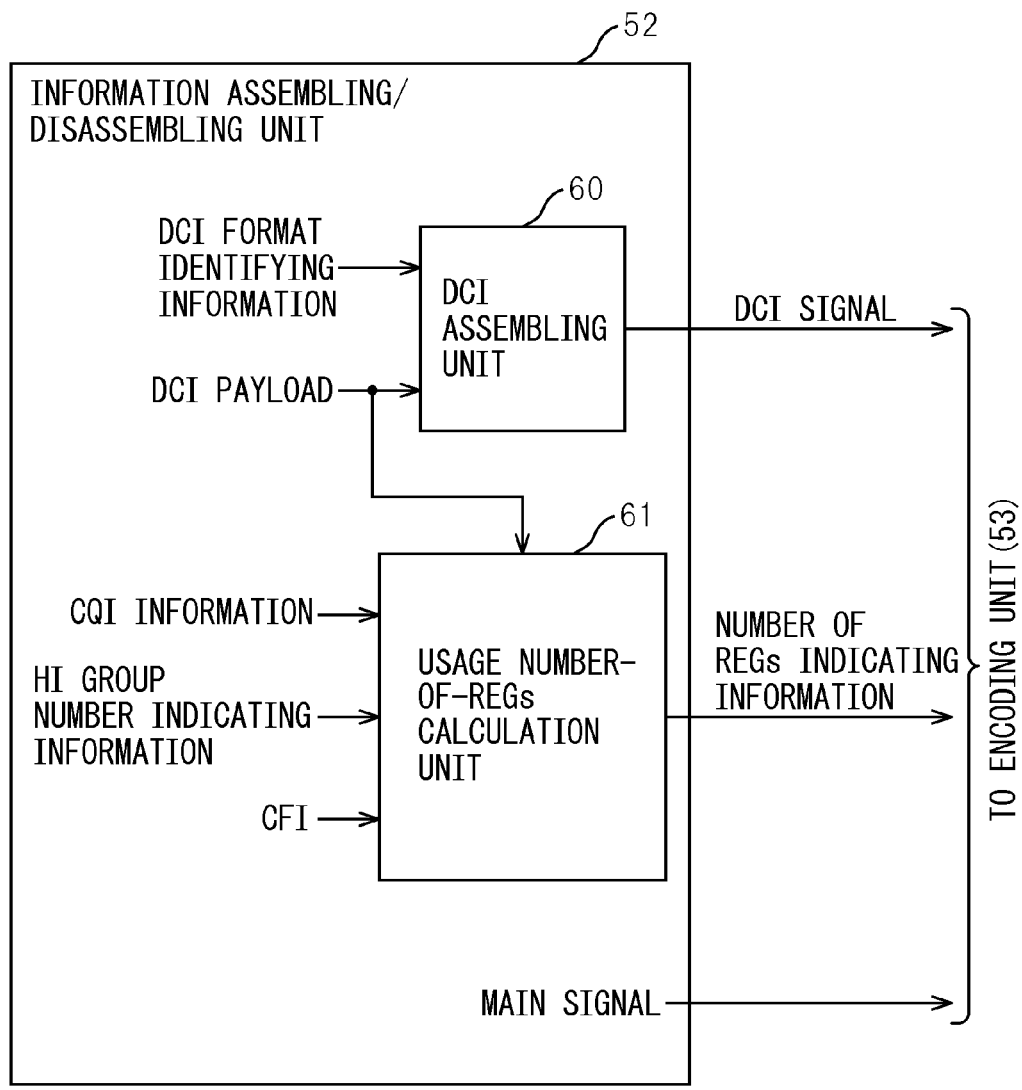
FIG. 15 is a view illustrating an example of the configuration of the information assembling/disassembling unit as illustrated in FIG. 14.

FIG. 15 is a view illustrating an example of the configuration of the information assembling/disassembling unit illustrated in FIG. 14. Reference numeral 60 denotes a DCI assembling unit, and reference numeral 61 denotes a usage number-of-REGs calculation unit. The information assembling/disassembling unit 52 has function of signal processing of main signal and of signal received on uplink channels, but description thereof in this specification is omitted for simplicity.

The DCI assembling unit 60 has DCI payload including downlink control information and DCI format identifying information inputted therein. The DCI assembling unit 60 assembles DCI signal by combining DCI payload for each channel in accordance with the DCI format identifying information for each DCI payload. The DCI assembling unit 60 outputs the assembled DCI signal to the encoding unit 53.

The usage number-of-REGs calculation unit 61 determines the length of data to which DCI signal of each channel has to be encoded by the encoding unit 53. Similarly to the above notation, DCI signal encoded by the encoding unit 53 are denoted as "coded data".

The usage number-of-REGs calculation unit 61 calculates the number of REGs that can transmit this data as the data length of the coded data for each channel. That is, the usage number-of-REGs calculation unit 61 calculates the number of REGs to be allocated for transmitting coded data for each channel.

The usage number-of-REGs calculation unit 61 calculates the number of REGs to be allocated to coded data of each channel by proportionally dividing the total number of REGs that can be used for mapping of PDCCH among various channels in accordance with a predetermined rule. The usage number-of-REGs calculation unit 61 may be mentioned as an example of the number-of-units determination unit as described in appended claims.

Number of OFDM symbols that can be used for mapping of PDCCH is designated by the value of CFI. In an embodiment described below, the usage number-of-REGs calculation unit 61 calculates the number of REGs to be allocated to coded data of each channel based on bit number of DCI signal, information on CQI (Channel Quality Indicator), and information on designated HI (Hybrid ARQ Indicator) group number. CQI information is information on wireless signal channel quality for each terminal (channel) from the base transceiver station apparatus 50 to each mobile station apparatus 100, and information on designated HI group number indicates the number of HI groups having HARQ control in uplink. An example of the method for calculating REGs by the usage number-of-REGs calculation unit 61 will be described later.

The usage number-of-REGs calculation unit 61 outputs the calculated number of REGs for each channel to the encoding unit 53. The encoding unit 53 encodes the DCI signal of each channel into coded data having data length corresponding to the number of REGs designated by the usage number-of-REGs calculation unit 61.

Figure 16:
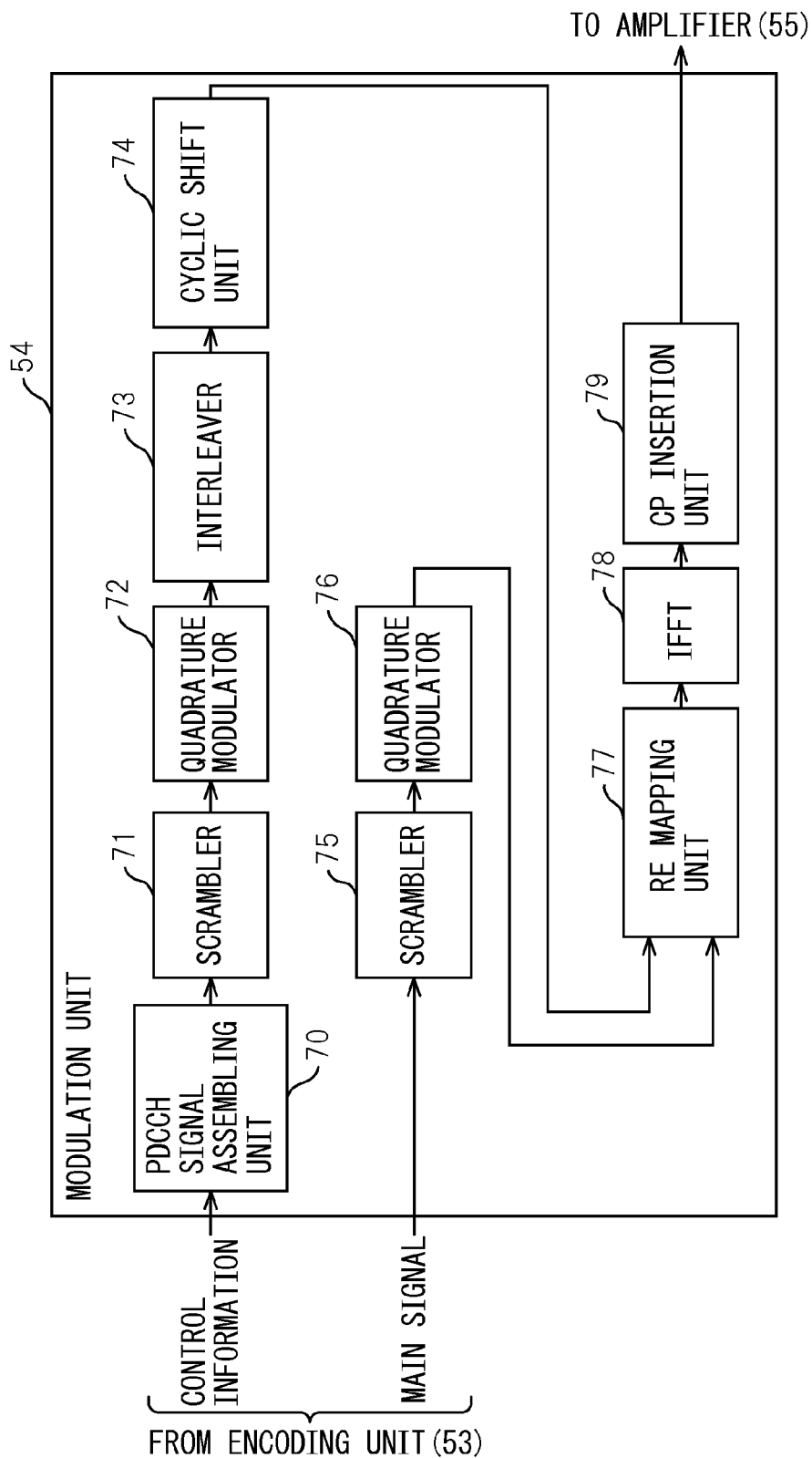
FIG. 16 is a view illustrating an example of the configuration of the modulation unit as illustrated in FIG. 14.

FIG. 16 is a view illustrating an example of the configuration of the modulation unit in FIG. 14. Reference numeral 70 denotes a PDCCH signal assembling unit, reference numeral 71 and 75 denote scramblers, reference numeral 72 and 76 denote quadrature modulators, reference numeral 73 denotes an interleaver, and reference numeral 74 denotes a cyclic shift unit. Reference numeral 77 denotes a resource element (RE) mapping unit, reference numeral 78 denotes an inverse Fourier transformation (IFFT) unit, and reference numeral 79 denotes a cyclic prefix (CP) insertion unit.

The modulation unit 54 includes the PDCCH signal assembling unit 70, the scramblers 71 and 75, the quadrature modulators 72 and 76, the interleaver 73 and the cyclicshift unit 74. The modulator 54 also includes the resource element mapping unit 77, the inverse Fourier transformation unit 78, and the cyclic prefix insertion unit 79. The quadrature modulators 72 and 76 may be, for example, phase shift modulators or quadrature amplitude modulators.

Figure 1:
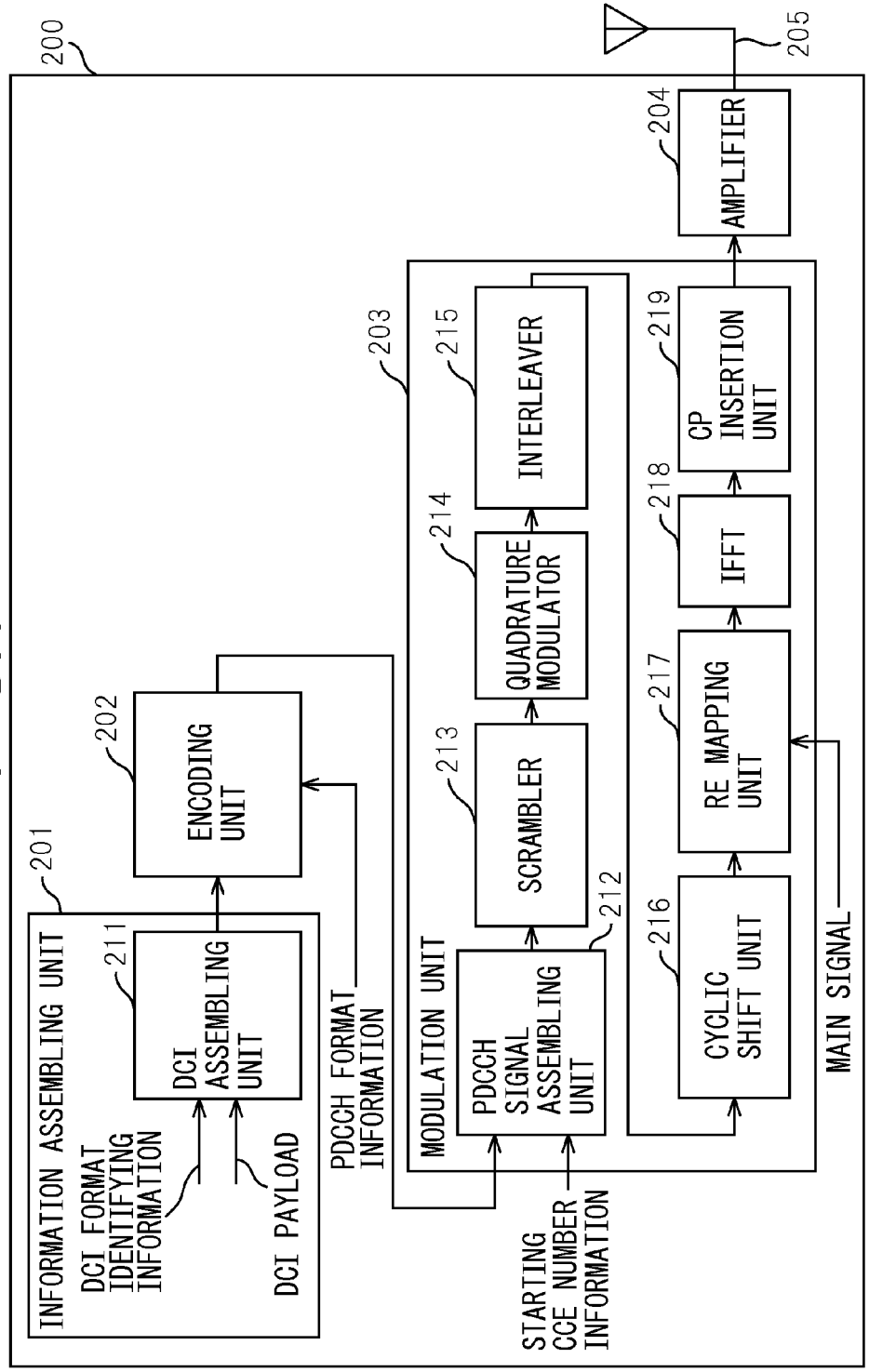
FIG. 1 is a view illustrating the configuration of a conventional method for allocating wireless resource.
Figure 2A:
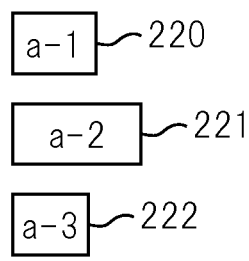
FIG. 2A is a view (part 1) illustrating the conventional method for allocating wireless resource.
Figure 2B:
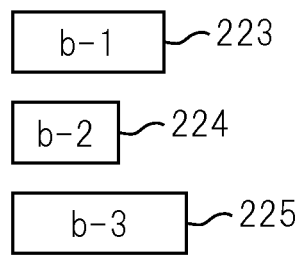
FIG. 2B is a view (part 2) illustrating the conventional method for allocating wireless resource.
Figure 2C:
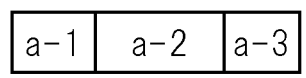
FIG. 2C is a view (part 3) illustrating the conventional method for allocating wireless resource.
Figure 2D:
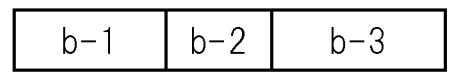
FIG. 2D is a view (part 4) illustrating the conventional method for allocating wireless resource.
Figure 2E:
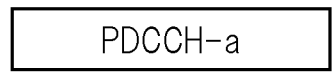
FIG. 2E is a view (part 5) illustrating the conventional method for allocating wireless resource.
Figure 2F:
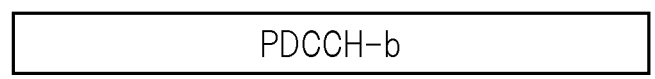
FIG. 2F is a view (part 6) illustrating the conventional method for allocating wireless resource.
Figure 3A:
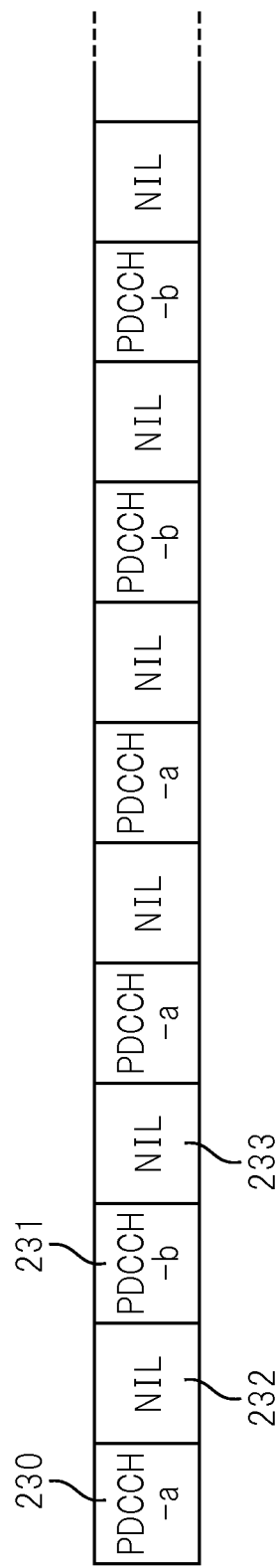
FIG. 3A is a view (part 8) illustrating the conventional method for allocating wireless resource.
Figure 3B:
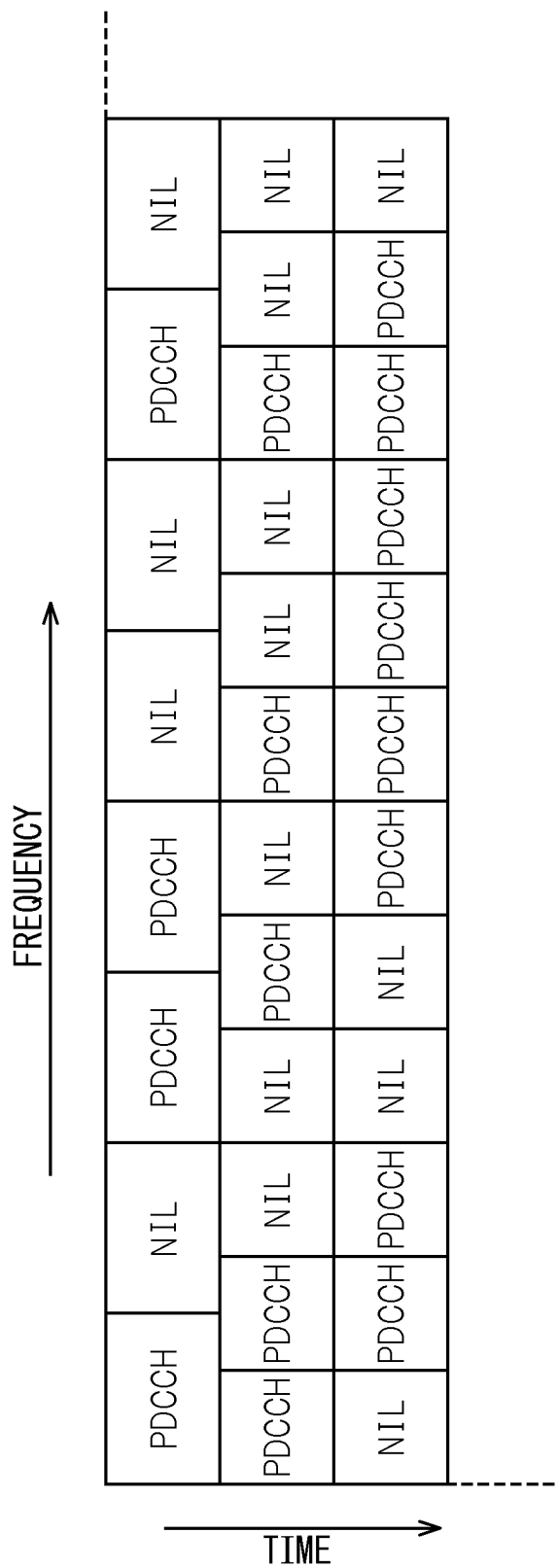
FIG. 3B is a view (part 9) illustrating the conventional method for allocating wireless resource.

Processing carried out by the scrambler 71, the quadrature modulator 72, the interleaver 73 and the cyclic shift unit 74 is respectively the same as the processing carried out by the scrambler 213, the quadrature modulator 214, the interleaver 215 and the cyclic shift unit 216 described above with reference to FIG. 1. Processing carried out by the resource element mapping unit 77 and the inverse Fourier transformation unit 78 is respectively the same as the processing carried out by the resource element mapping unit 217 and the inverse Fourier transformation unit 218. Processing carried out by the cyclic prefix insertion unit 79 is the same as the processing carried out by the cyclic prefix insertion unit 219.

The scrambler 75 scrambles main signal encoded by the encoding unit 53. The quadrature modulator 76 carries out quadrature modulation of the scrambled main signal to thereby generate symbol of the main signal to be mapped to the resource element. The symbol generated by the quadrature modulator 76 is mapped to the resource element by the resource element mapping unit 77.

The PDCCH signal assembling unit 70 combines DCI signal encoded by the encoding unit 53, that is, the coded data. Similarly to the notation described above, data generated by combining the encoded DCI signal by the PDCCH signal assembling unit 70 is denoted as "PDCCH data".

When the PDCCH signal assembling unit 70 assembles PDCCH data by combining the coded data, the coded data of various channels are interconnected continuously. Therefore, the PDCCH signal assembling unit 70 needs not insert NIL data between the coded data stored in PDCCH data. Thus, REG for mapping NIL data can be eliminated and utilization efficiency of wireless resource can be thereby improved. The PDCCH signal assembling unit 70 may be mentioned as an example of the interconnection unit as described in appended claims.

Next, an example of the method for calculating REG by the usage number-of-REGs calculation unit 61 will be described below. The calculation method described below exemplifies a method of calculating the number of REGs that can be used in the communication system 40. Following description is not intended to limit the calculation method in the communication system 40 to this embodiment, and various other methods can be used for calculating the number of REGs.

Figure 17:
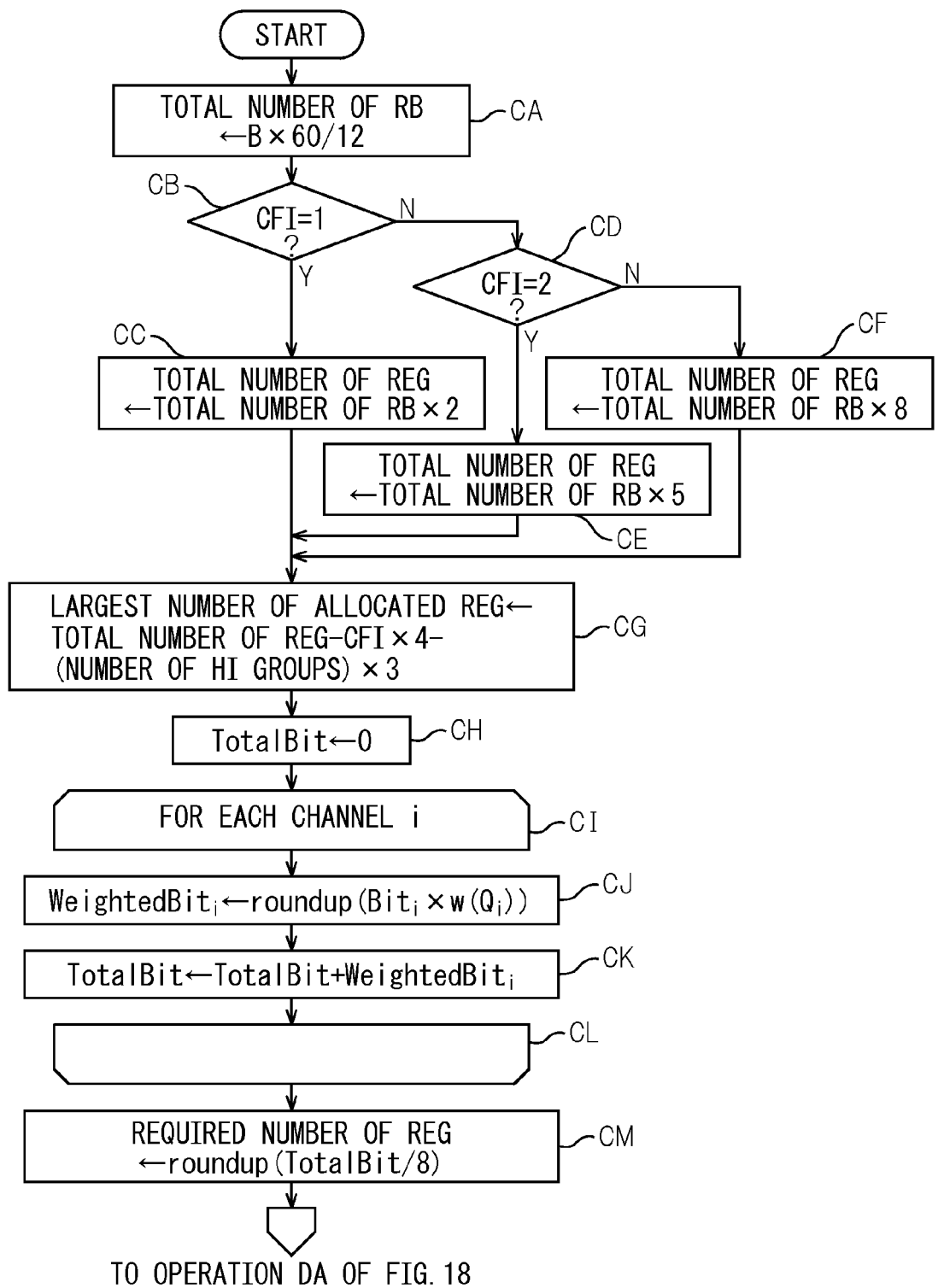
FIG. 17 is a view (part 1) illustrating a method of determining the number of REGs allocated to a downlink physical control channels.
Figure 18:
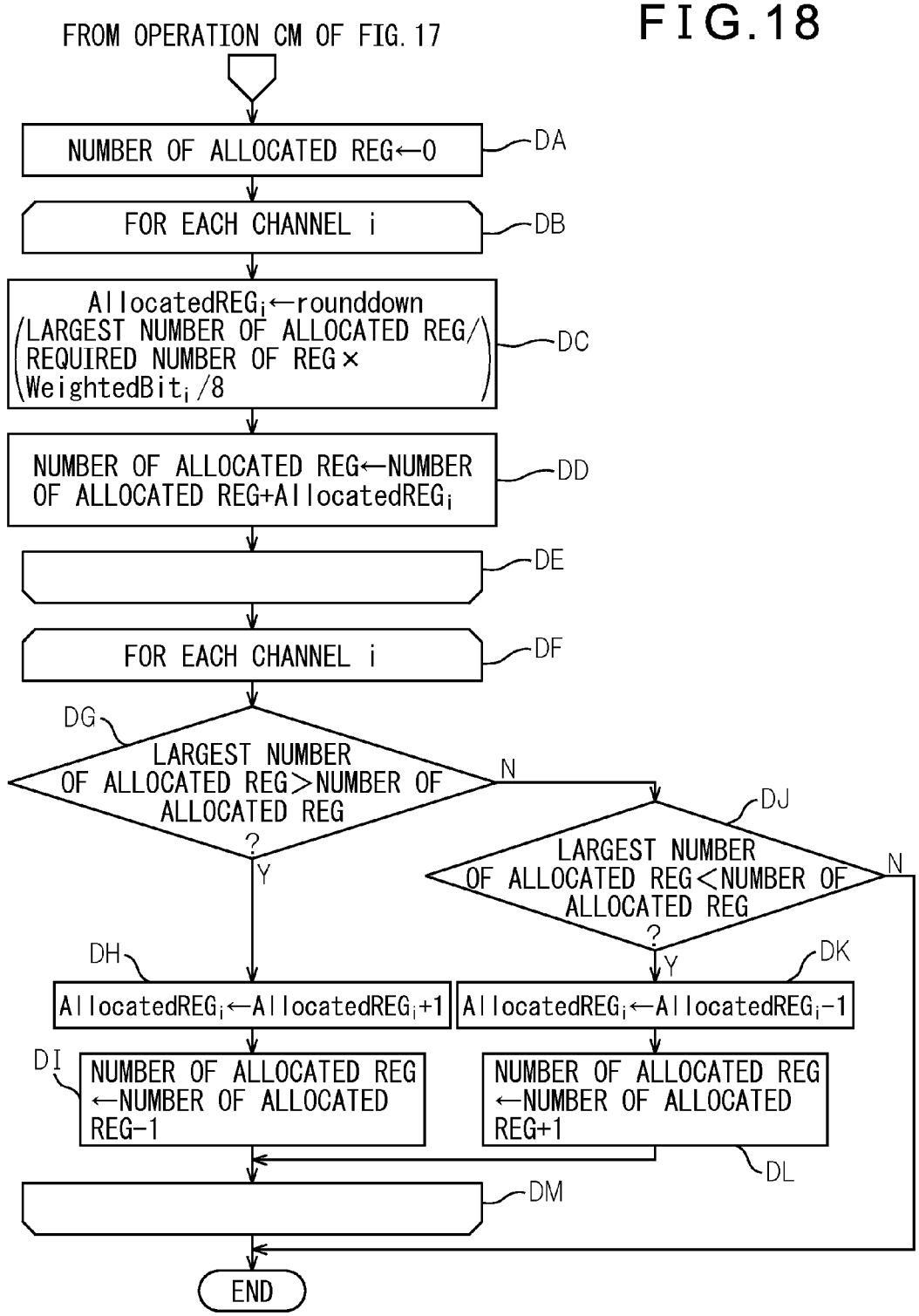
FIG. 18 is a view (part 2) illustrating a method of determining the number of REGs allocated to a downlink physical control channels.

FIGS. 17 and 18 are views illustrating a method for determining the number of REGs allocated to downlink physical control channels. In another embodiment, each of the following operations CA to CM and DA to DM may be a step.

In operation CA, the usage number-of-REGs calculation unit 61 calculates total number of resource blocks (RB) allocated for mapping of PDCCH. For example, when the bandwidth of the frequency resource is "B" MHz, the usage number-of-REGs calculation unit 61 calculates the total number of resource blocks from the following formula: (total number of resource blocks)=(number of subcarriers)×B/12. For example, if the bandwidth of the frequency resource B is B=5 MHz, and the number of subcarriers is 60, total number of resource blocks is 5×60/12=25.

In operation CB, the usage number-of-REGs calculation unit 61 determines whether or not the value of CFI is "1". If the value of CFI is "1" (operation CB: Y), the usage number-of-REGs calculation unit 61 passes the processing to operation CC. If the value of CFI is not "1" (operation CB: N), the usage number-of-REGs calculation unit 61 passes the processing to operation CD.

In operation CC, the usage number-of-REGs calculation unit 61 calculates the total number of REGs included in OFDM symbol used for transmission of PDCCH from the following formula: (total number of REGs)=(total number of resource blocks)×2. Thereafter, the usage number-of-REGs calculation unit 61 passes the processing to operation CG.

In operation CD, the usage number-of-REGs calculation unit 61 determines whether or not the value of CFI is "2". If the value of CFI is "2" (operation CD: Y), the usage number-of-REGs calculation unit 61 passes the processing to operation CE. If the value of CFI is not "2" (operation CD: N), the usage number-of-REGs calculation unit 61 passes the processing to operation CF.

In operation CE, the usage number-of-REGs calculation unit 61 calculates the total number of REGs included in OFDM symbol used for transmission of PDCCH from following formula: (total number of REGs)=(total number of resource blocks)×5. Thereafter, the usage number-of-REGs calculation unit 61 passes the processing to operation CG.

In operation CF, the usage number-of-REGs calculation unit 61 calculates the total number of REGs included in OFDM symbol used for transmission of PDCCH from following formula: (total number of REGs)=(total number of resource blocks)×8. Thereafter, the usage number-of-REGs calculation unit 61 passes the processing to operation CG.

In operation CG, the usage number-of-REGs calculation unit 61 calculates the largest number of allocated REGs that is the largest number of REGs that can be allocated for mapping of PDCCH from following formula: (the largest number of REGs)=(total number of REG)−CFI×4−(the number of HI groups)×3. In operation CH, the usage number-of-REGs calculation unit 61 substitutes the value "0" into the variable TotalBit.

Next, the usage number-of-REGs calculation unit 61 carries out processing loop including operations CI to CL for each channel i of PDCCH between the base transceiver station apparatus 50 and each mobile station apparatus 100.

In operation CJ, the usage number-of-REGs calculation unit 61 calculates weighted bit number for each channel by multiplying the bit number $Bit_i$ of coded data for channel i by a weighting coefficient $w(Q_i)$ depending on the value $Q_i$ of CQI information for each channel i. Value of weighted bit number for channel i ($WeightedBit_i$) is given by following formula: $WeightedBit_i$=roundup($Bit_i \times w(Q_i)$). Function roundup refers to a function that rounds up a decimal. FIG. 19 depicts the weighting coefficient w(x) respectively defined for each CQI value x.

Referring to FIG. 17, in operation CK, the usage number-of-REGs calculation unit 61 calculates total sum of weighted bit number, TotalBit, by accumulating the weighted bit number $WeightedBit_i$ calculated for each channel i. After processing of the loop including operations CI to CL has been completed, the usage number-of-REGs calculation unit 61 passes the processing to operation CM.

In operation CM, the usage number-of-REGs calculation unit 61 calculates desired number of REGs desired for transmission of data having length corresponding to the total sum of weighted bit number, TotalBit, from the following formula: desired number of REGs=roundup(TotalBit/(4×m)). The constant m represents the bit number that can be expressed by 1 complex symbol in multi-level modulation in the quadrature demodulator 72. For example, if the quadrature demodulator 72 carries out QPSK (quadrature phase shift keying), m=4, so that value of the desired number of REGs is calculated from the formula:

desired number of REGs=roundup(TotalBit/8).

In operation DA, the usage number-of-REGs calculation unit 61 substitutes the value "0" into the variable "allocated number of REGs". Then, the usage number-of-REGs calculation unit 61 carries out the processing loop including operations DB to DE.

In operation DC, the usage number-of-REGs calculation unit 61 provisionally determines the number of REGs to be allocated to coded data in each channel i, $AllocatedREG_i$, by the formula (1). In the formula (1), the function rounddown is a function that rounds up a decimal.

$AllocatedREG_i$=rounddown(largest number of allocated REGs/desired REGs×$WeightedBit_i$/8)  (1)

The ratio, largest number of allocated REGs/desired REGs, is a ratio of the largest number of REGs that can be actually allocated to PDCCH to the number of desired REGs that is desired for transmission of data having length equal to the total sum of the weighted bit value, WeightedBit$_i$. Therefore, from the above formula (1), by multiplying the ratio, largest number of allocated REGs/desired REGs, by the weighted bit number of coded data for each channel i, the number of REGs that divides the largest number of REGs which can be allocated in proportion to the weighted bit number can be calculated.

By thus dividing the total number of REGs proportionally in proportion to the weighted bit number, WeightedBit$_i$, in dependence on line quality $Q_i$, it becomes possible to lower coded rate of control information transmitted over channels of poor line quality. By lowering the coded rate, successful reception rate of control information can be improved.

In operation DD, the usage number-of-REGs calculation unit 61 calculates the number of allocated REGs by accumulating AllocatedREG$_i$ calculated for each channel i.

When processing of loop including operations DB to DE has been completed, the usage number-of-REGs calculation unit 61 passes the processing to operation DF. The usage number-of-REGs calculation unit 61 carries out processing of the loop including operations DF to DM for each channel i. In the loop including operations DF to DM, the usage number-of-REGs calculation unit 61 adjusts the number of REGs allocated to each channel i, so that the largest number of allocated REGs becomes equal to the number of allocated REGs.

In operation DG, the usage number-of-REGs calculation unit 61 determines whether or not the largest number of allocated REGs is larger than the number of allocated REGs. If the largest number of allocated REGs is larger than the number of allocated REGs (operation DG: Y), the number of REGs calculation unit 61 passes the processing to operation DH. If the largest number of allocated REGs is not larger than the number of allocated REGs (operation DG: N), the usage number-of-REGs calculation unit 61 passes the processing to operation DJ.

In operation DH, the usage number-of-REGs calculation unit 61 increases the number of REGs allocated to coded data of channel i by one. In operation DI, the usage number-of-REGs calculation unit 61 decreases the number of allocated REGs by one. Thereafter, the usage number-of-REGs calculation unit 61 returns the processing to operation DF.

In operation DJ, the usage number-of-REGs calculation unit 61 determines whether or not the largest number of allocated REGs is smaller than the number of allocated REGs. If the largest number of allocated REGs is smaller than the number of allocated REGs (operation DJ: Y), the usage number-of-REGs calculation unit 61 passes the processing to operation DK.

In operation DK, the usage number-of-REGs calculation unit 61 decreases the number of REGs allocated to the coded data of channel i, AllocatedREG$_i$, by one. In operation DL, the usage number-of-REGs calculation unit 61 increases the number of allocated REGs by one. Thereafter, the usage number-of-REGs calculation unit 61 returns the processing to operation DF.

In the determination in operation DJ, if the largest number of allocated REGs is not smaller than the number of allocated REGs (operation DJ: N), the number of allocated REGs is equal to the largest number of allocated REGs, and therefore, the usage number-of-REGs calculation unit 61 exits the loop, and the processing is terminated.

FIG. 20 is a view depicting the result of calculation of allocated number of REGs. In this exemplary calculation, it was assumed that bandwidth of frequency resource is 5 MHz, CFI=1, and number of HI groups is 5. Thus, calculated value of the largest number of allocated REGs is 31.

In this exemplary calculation, it was also assumed that values $Q_i$ of CQI value for each group i (i=0 to 4) are respectively 5, 8, 2, 15, and 0. In this exemplary calculation, it was also assumed that values of bit numbers, Bit$_i$, of the coded data for each group i (i=0 to 4) are respectively 25, 20, 13, 12, and 15. By adopting the weighting coefficient depicted in FIG. 19, the calculated weighted bit number for each channel i, WeightedBit$_i$, are respectively 75, 54, 43, 24, and 53. Therefore, the total sum of the weighted bit numbers, TotalBit, is calculated to be 249, and value of desired number of REGs is calculated to be 32.

Calculated values of the number of allocated REGs for each channel i, AllocatedREG$_i$, before adjustment of the number of REGs in loop including operations DF to DM are respectively 9, 6, 5, 2, and 6. At this time, the value of the number of allocated REGs is 28, and is smaller than the largest number of REGs 31 by 3.

By adjusting the number of REGs in loop including operations DF to DM, the numbers of REGs allocated to channel 0, 1, and 2 are increased by one. Therefore, the number of REG allocated to each channel i, AllocatedREG$_i$, becomes 10, 7, 6, 2, and 6, respectively.

Figure 21A:
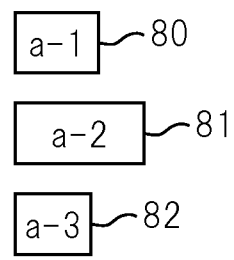
FIG. 21A is a view (part 1) illustrating a method of allocating REGs to downlink physical control channels.
Figure 21B:
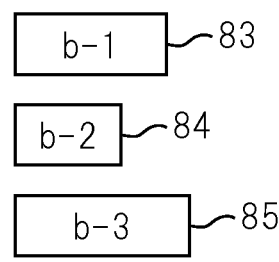
FIG. 21B is a view (part 2) illustrating a method of allocating REGs to downlink physical control channels.
Figure 21C:
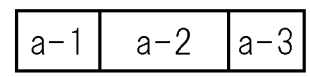
FIG. 21C is a view (part 3) illustrating a method of allocating REGs to downlink physical control channels.
Figure 21D:
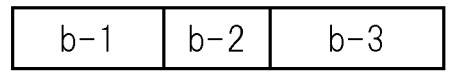
FIG. 21D is a view (part 4) illustrating a method of allocating REGs to downlink physical control channels.

Next, referring to FIG. 21A to FIG. 21G, FIG. 22A and FIG. 22B, processing flow in which the control information of PDCCH is allocated to resource element in the base transceiver station apparatus 50 of FIG. 14 will be described. FIG. 21A and FIG. 21B respectively depict DCI payloads that are inputted to the DCI assembling unit 60 of FIG. 15. Reference numerals 80 to 82 denote respectively three different DCI payloads each generated in a first DCI format, and reference numerals 83 to 85 denote respectively DCI payloads each generated in a second DCI format. FIG. 21C depicts DCI signal assembled by DCI assembling unit 60 by combining the DCI payloads 80 to 82. FIG. 21D depicts DCI signal assembled by DCI assembling unit 60 by combining the DCI payloads 83 to 85.

Figure 21E:
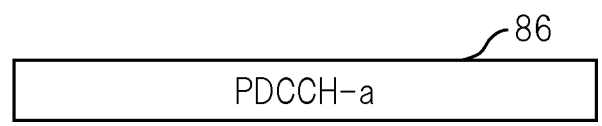
FIG. 21E is a view (part 5) illustrating a method of allocating REGs to downlink physical control channels.
Figure 21F:
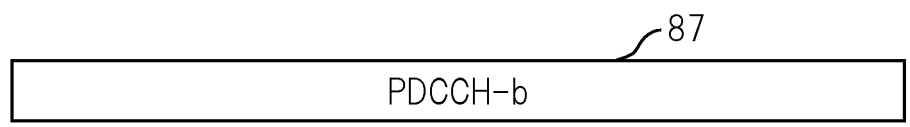
FIG. 21F is a view (part 6) illustrating a method of allocating REGs to downlink physical control channels.

FIG. 21E depicts the coded data 86 generated by encoding of the DCI signal of FIG. 21C by the encoding unit 53 of FIG. 14. FIG. 21F depicts the coded data 87 generated by encoding of the DCI signal of FIG. 21D by the encoding unit 53. The encoding unit 53 encodes the DCI signal into coded data 86 and 87 having data length corresponding to the number of REGs determined by the usage number-of-REGs calculation unit 61 of FIG. 15. Therefore, data length of coded data 86 and 87 combined is equal to the data length corresponding to the sum of REGs allocated for mapping of PDCCH.

Figure 21G:
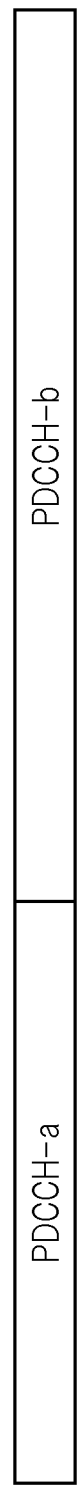
FIG. 21G is a view (part 7) illustrating a method of allocating REGs to downlink physical control channels.

FIG. 21G illustrates PDCCH data assembled from the coded data 86 and 87 by the PDCCH signal assembling unit 70 of FIG. 16. The PDCCH signal assembling unit 70 interconnects the coded data 86 and 87 continuously so as to assemble PDCCH data. Therefore, the PDCCH signal assembling unit 70 does not insert NIL data between the coded data 86 and 87 stored in PDCCH data.

Since data length of coded data 86 and 87 combined is the same as the data length corresponding to the sum of REGs allocated for mapping of PDCCH, the PDCCH signal assembling unit 70 does not insert NIL data into PDCCH data.

FIG. 22A is a view illustrating data obtained by processing of the PDCCH data as depicted in FIG. 21G by the scrambler 71, the quadrature modulator 72, the interleaver 73 and the cyclic shift unit 74 illustrated in FIG. 16. Indications "PDCCH-a" and "PDCCH-b" in the rectangle depicting data mean that respective data are data depicting information contained in the coded data 86 and 87. Since no NIL data are included in the original data, data depicted in FIG. 22A do not include NIL data either.

FIG. 22B illustrates the data in FIG. 22A mapped to each resource element by the resource element mapping unit 77. As illustrated in FIG. 22B, NIL data are not mapped to any resource element.

Since, in accordance with the present embodiment, all REGs provided for mapping of PDCCH are divided proportionally to various channels and utilized, improvement of utilization efficiency of wireless resource can be achieved. In the present embodiment, with the improvement of utilization efficiency of wireless resource, coded rate of PDCCH can be lowered, and successful reception rate of control information can be thereby improved.

Also in accordance with the present embodiment, no gap for inserting NIL data is produced between the coded data 86 and 87 stored in PDCCH data, so that occurrence of wireless resource with no data mapped thereto can be avoided.

Figure 23:
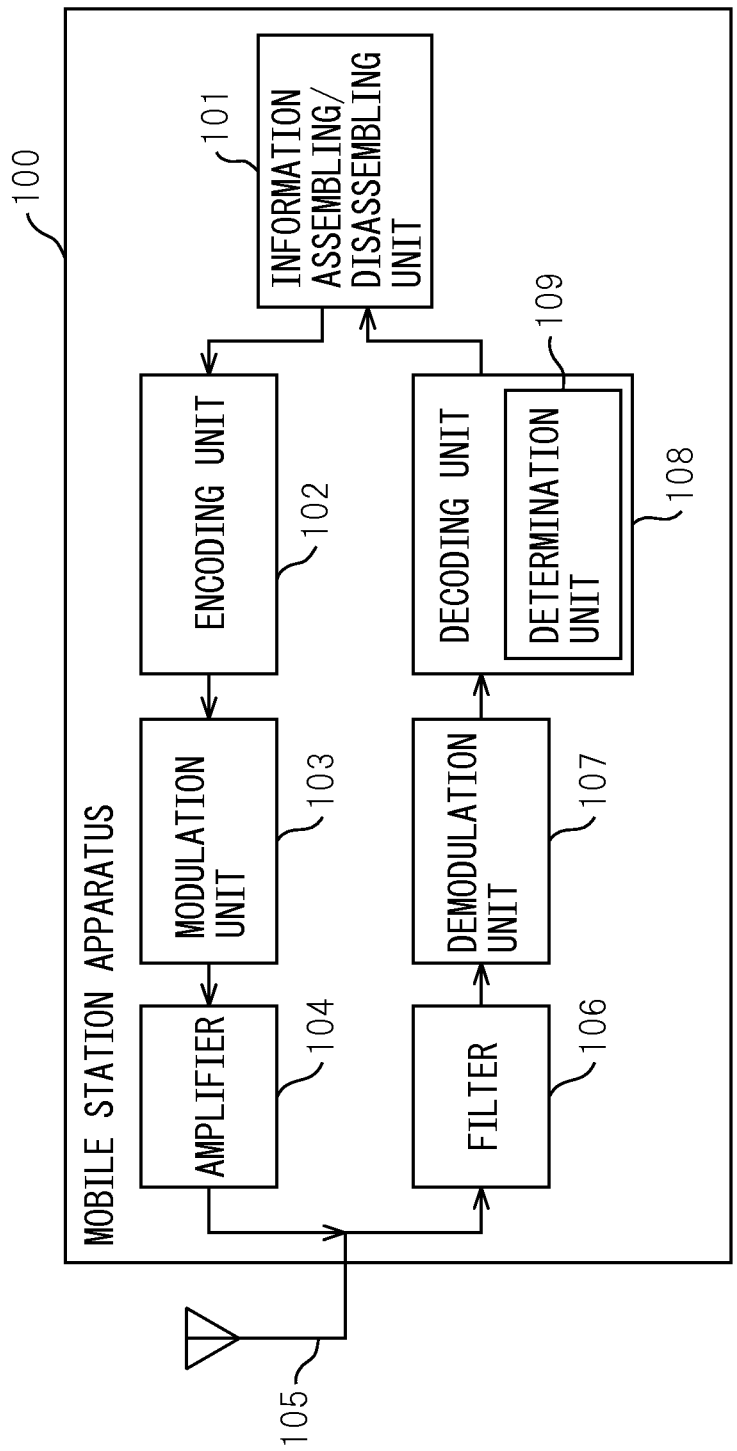
FIG. 23 is a view illustrating an example of the configuration of a mobile station apparatus as illustrated in FIG. 13.

Next, reception of control information of PDCCH by the mobile station apparatus as depicted in FIG. 13 will be described below. FIG. 23 is a view illustrating an example of the configuration of the mobile station apparatus as depicted in FIG. 13. Reference numeral 101 denotes an information assembling/disassembling unit, reference numeral 102 denotes an encoding unit, reference numeral 103 denotes a modulation unit, reference numeral 104 denotes an amplifier, and reference numeral 105 denotes an antenna. Reference numeral 106 denotes a filter, reference numeral 107 denotes a demodulation unit, reference numeral 108 denotes a decoding unit, and reference numeral 109 denotes a determination unit.

The mobile station apparatus 100 include the information assembling/disassembling unit 101, the encoding unit 102, the modulation unit 103, the amplifier 104, the antenna 105, the filter 106, the demodulation unit 107, the decoding unit 108, and the determination unit 109. The determination unit 109 may be a part of function of the decoding unit 108, or may be a separate component other than the decoding unit 108.

The information assembling/disassembling unit 101 carries out signal processing of baseband signal of user data and control information transmitted between the base transceiver station apparatus 50 and the mobile station apparatus 100. The encoding unit 102 encodes uplink channel signal generated by the information assembling/disassembling unit 101. The modulation unit 103 modulates the signal encoded by the encoding unit 102, and generates radio-frequency signal. The radio-frequency signal is amplified by the amplifier 104, and is transmitted from the antenna 105.

The filter 106 limits the frequency band of OFDM signal of uplink channel received from the base transceiver station apparatus 50. The demodulation unit 107 demodulates the OFDM signal having band width limited by the filter 106, and extracts coded data. The decoding unit 108 carries out decoding processing of the coded data extracted by the demodulation unit 107. The decoded baseband signal is inputted to the information assembling/disassembling unit 101.

The demodulation unit 107 reproduces, by demodulating OFDM signal, PDCCH data assembled by the PDCCH signal assembling unit 70 of the base transceiver station apparatus 50 illustrated in FIG. 16. The decoding unit 108 reproduces DCI signal before encoding by decoding PDCCH data demodulated by the demodulation unit 107. The determination unit 109 determines whether or not DCI signal addressed to this mobile station apparatus 100 is included in the received signal.

An example of determination processing carried out by the determination unit 109 to determine whether or not DCI signal addressed to this mobile station apparatus 100 is included in the received signal, will be described below. In order to determine to which mobile station DCI signal is addressed, DCI signal may contain the identifier of the destination communication apparatus.

Figure 24:
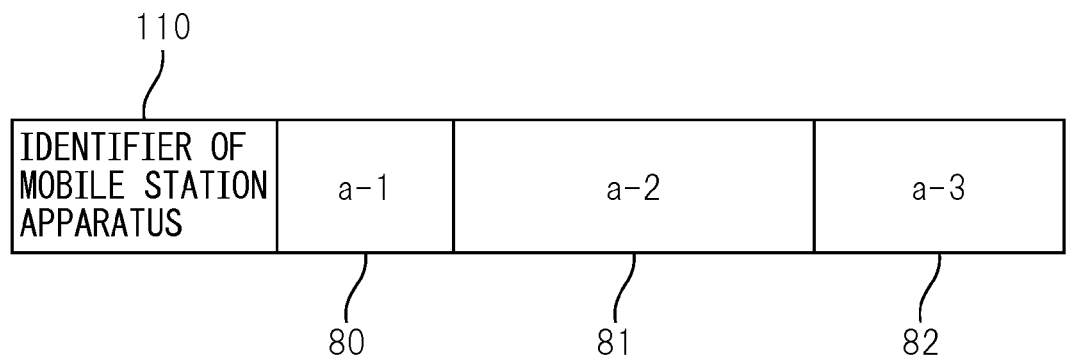
FIG. 24 is a view illustrating the format of DCI signal transmitted to the mobile station apparatus illustrated in FIG. 13.

FIG. 24 is a view useful for illustrating the format of DCI signal transmitted to the mobile station apparatus illustrated in FIG. 13. FIG. 24 depicts DCI signal before being encoded. For example, DCI signal includes DCI payloads 80 to 82 described above with reference to FIG. 21A. DCI signal also includes an identifier 110 of the destination communication apparatus to which DCI signal is transmitted.

The decoding unit 108 reads out partial data respectively starting from different positions and having different lengths in PDCCH data before decoding that have been outputted from the demodulation unit 107. At this time, the decoding unit 108 reads out partial data respectively starting from different positions and having different lengths in PDCCH data before decoding by varying the starting position and data length for reading out partial data. The determination unit 109 determines whether or not the identifier of the mobile station apparatus 100 is included in DCI signal obtained by decoding respective partial data by the decoding unit 108.

FIG. 25 is a view useful for illustrating decoding processing performed by the mobile station apparatus of FIG. 13. Each operation in the operations EA to EJ of FIG. 11 may be a step. In operations EA and EB, the decoding unit 108 substitutes value "1" into the variable i, and value of the variable i into the variable j.

In operation EC, the decoding unit 108 decodes partial data read out from PDCCH data demodulated by the demodulation unit 107. Unit of data length when partial data are read out from PDCCH data by the decoding unit 108 is equal to the data length that can be transmitted by one REG. Thus, partial data read out have length equal to an integral multiple of the data length that can be transmitted by one REG.

The decoding unit 108 selects the starting position for reading out partial data in PDCCH data from among plural predetermined candidate readout starting positions. Separation of candidate readout starting positions from each other is equal to data length that can be transmitted by one REG, and the first candidate readout starting position is the top position of PDCCH data.

FIG. 26 illustrates candidate readout starting positions defined in this way. Reference numeral 124 denotes PDCCH data. Plural dashed lines depicted below PDCCH data represent respective candidate readout starting positions. The number in the parenthesis for each respective candidate readout starting position represents the numerical order of each candidate readout starting position as counted from the first candidate readout starting position. Separation between adjoining dashed lines is data length that can be transmitted by one REG, and is equal to the unit of data length for reading out partial data from PDCCH data 124.

In other words, the unit of partial data read out from PDCCH data 124 by the decoding unit 108 is one block obtained when PDCCH data 124 are divided into blocks of data length that can be transmitted by one REG unit. The candidate readout starting positions at which the decoding unit 108 can start readout of partial data from PDCCH data 124 are respective top position of blocks described above.

In operation EC, the decoding unit 108 reads out partial data from PDCCH data 124 from the block starting from i-th candidate staring position for reading out to the block starting from j-th candidate staring position for reading out, and decodes the partial data.

In operation ED, the determination unit 109 determines whether or not the identifier of this mobile station apparatus 100 is stored at a predetermined position of DCI signal decoded in operation EC. If the decoded partial data coincide with the coded data addressed to this mobile station apparatus 100, the identifier of this mobile station apparatus 100 is included in decoded DCI signal (operation ED: Y). If the identifier of this mobile station apparatus 100 is included in decoded DCI signal, the processing proceeds to operation EI.

If the decoded partial data do not coincide with the coded data addressed to this mobile station apparatus 100, normal decoding has not been achieved or the decoded DCI signal includes an identifier of other mobile station apparatus (operation ED: N). If the identifier of this mobile station apparatus 100 is not included in decoded DCI signal, the processing proceeds to operation EE.

In operation EE, the decoding unit 108 determines whether or not the variable j is the largest number of REGs that can be allocated for mapping of PDCCH. If the variable j is the largest number of REGs (operation EE: Y), the processing proceeds to operation EG. If the variable j is not the largest number of REGs (operation EE: N), the processing proceeds to operation EF. In operation EF, the decoding unit 108 increases the value of the variable j by one, and returns the processing to operation EC.

In operation EG, the decoding unit 108 determines whether or not the variable i is the largest number of REGs that can be allocated for mapping of PDCCH. If the variable i is the largest number of REGs (operation EG: Y), the processing proceeds to operation EJ. If the variable i is not the largest number of REGs (operation EG: N), the processing proceeds to operation EH. In operation EH, the decoding unit 108 increase the value of the variable i by one, and returns the processing to operation EB.

In operation EC, if the identifier of this mobile station apparatus 100 is included in the decoded DCI signal, then, in operation EI, the decoding unit 108 outputs the decoded DCI signal as DCI signal addressed to this mobile station apparatus 100, and thereafter, the processing is terminated.

In operation EG, if the variable i reaches the largest number of REGs, then, in operation EJ, the decoding unit 108 determines that DCI signal addressed to this mobile station apparatus 100 is not included in the received signal, and thereafter, the processing is terminated.

Referring to FIG. 26, the decoding processing of PDCCH data 124 by the decoding unit 108 and the determination unit 109 will be described below. PDCCH data 124 includes coded data 122 addressed to this mobile station apparatus 100 and coded data 121 and 123 addressed to other mobile station apparatuses. In the following description, for convenience of illustration, the block starting from the i-th candidate readout starting position of PDCCH data 124 is described as i-th block (i=1 to 11).

First, the decoding unit 108 decodes respective partial data read out from the first block to the i-th block (i=2 to 11). These partial data do not coincide with the coded data addressed to this mobile station apparatus 100. Thus, the identifier of this mobile station apparatus 100 does not appear at the predetermined position of the signal obtained as a result of decoding. Therefore, the decoding unit 108 changes the starting position for reading out partial data from the first block to the second block.

Next, the decoding unit 108 decodes respective partial data read out from the second block to the i-th block (i=3 to 11). In this case too, the identifier of this mobile station apparatus 100 does not appear at the predetermined position of the signal obtained as a result of decoding. The decoding unit 108 changes the starting position for reading out partial data from the second block to the third block.

The decoding unit 108 decodes respective partial data read out starting from the third block with varying data length. When the decoding unit 108 decodes partial data starting from the third block and ending with the ninth block, the identifier of this mobile station apparatus 100 appears at a predetermined position of the signal obtained as a result of encoding. The decoding unit 108 outputs DCI signal obtained by this decoding.

In accordance with the present embodiment, it becomes possible to determine whether or not DCI signal transmitted via PDCCH from the base transceiver station apparatus 50 of FIG. 14 is DCI signal addressed to this mobile station apparatus 100.

With the apparatus or method as disclosed herein, utilization efficiency of wireless resource designated for mapping physical control channels can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A communication apparatus comprising:
a number-of-units determination unit which calculates a total amount of control information transmitted on a plurality of physical control channels, calculates a ratio between the calculated total amount of the control information and a total number of resource units included in a wireless resource designated for mapping of the plurality of physical control channels, and determines a number of resource units to be allocated to each of the plurality of physical control channels based on the calculated ratio and an amount of data of control information transmitted on each of the plurality of physical control channels;
an encoding unit which encodes the control information respectively transmitted on each of the plurality of physical control channels into data which can be transmitted with the number of resource units determined by said number-of-units determination unit;
a modulation unit which modulates said encoded control information;
a transmission unit which transmits said modulated encoded control information; and
an interconnection unit which interconnects continuously a series of said control information encoded by said encoding unit and supplies them to said modulation unit,
wherein said modulation unit modulates the data interconnected by said interconnection unit and
wherein said control information includes an identifying information of a destination communication apparatus to which said control information is transmitted.

2. The communication apparatus as claimed in claim 1, wherein data amount of said control information transmitted over each of the plurality of physical control channels is weighted by respective line quality of each of the plurality of physical control channels.

3. A communication apparatus which is a second communication apparatus which receives control information transmitted over respective physical control channels from a first communication apparatus, said second communication apparatus comprising:

a reception unit which receives a signal transmitted over the physical control channels from said first communication apparatus;

a demodulation unit which demodulates the signal received by said reception unit;

a decoding unit which decodes partial data respectively read out in order from a head of the data demodulated by said demodulation unit by varying a data starting position and a data length; and a determination unit which determines whether or not an identifying information of said second communication apparatus is included in said control information obtained by decoding said partial data.

4. A base station apparatus comprising:

a number-of-units determination unit which calculates a total amount of control information transmitted on a plurality of downlink physical control channels, calculates a ratio between the calculated total amount of the control information and a total number of resource units included in a wireless resource designated for mapping of the plurality of downlink physical control channels, and determines a number of resource units to be allocated to each of the plurality of downlink physical control channels based on the calculated ratio and an amount of data of control information transmitted on each of the plurality of physical control channels;

an encoding unit which encodes the control information to be transmitted respectively on each of the plurality of downlink physical control channels into data which can be transmitted by the number of resource units determined by said number-of-units determination unit;

a modulation unit which modulates said encoded control information;

a transmission unit which transmits said modulated encoded control information; and an interconnection unit which interconnects continuously a series of said control information encoded by said encoding unit and supplies them to said modulation unit, wherein said modulation unit modulates the data interconnected by said interconnection unit and wherein said control information includes an identifying information of a destination communication apparatus to which said control information is transmitted.

5. A mobile station apparatus which receives control information transmitted respectively on downlink physical control channels from a base station apparatus, the mobile station apparatus comprising:

a reception unit which receives a signal transmitted over the downlink physical control channels from said base station apparatus;

a demodulation unit which demodulates the signal received by said reception unit;

a decoding unit which decodes partial data respectively read out in order from a head of the data demodulated by said demodulation unit by varying a data starting position and a data length; and a determination unit which determines whether or not an identifying information of said mobile station apparatus is included in said control information obtained respectively by demodulating said partial data.

6. A communication system comprising a base station apparatus and a mobile station apparatus which receives control information transmitted respectively on downlink physical control channels from said base station apparatus; wherein said base station apparatus comprises:

a number-of-units determination unit which calculates a total amount of control information transmitted on a plurality of downlink physical control channels, calculates a ratio between the calculated total amount of the control information and a total number of resource units included in a wireless resource designated for mapping of the plurality of downlink physical control channels, and determines a number of resource units to be allocated to each of the plurality of downlink physical control channels based on the calculated ratio and an amount of data of control information transmitted on each of the plurality of physical control channels;

an encoding unit which encodes the control information to be transmitted respectively on each of the plurality of downlink physical control channels into data which can be transmitted by the number of resource units determined by said number-of-units determination unit;

a modulation unit which modulates said encoded control information;

a transmission unit which transmits said modulated encoded control information; and an interconnection unit which interconnects continuously a series of said control information encoded by said encoding unit and supplies them to said modulation unit, wherein said modulation unit modulates the data interconnected by said interconnection unit and wherein said control information includes an identifying information of a destination communication apparatus to which said control information is transmitted.

7. The communication system as claimed in claim 6, wherein said control information includes an identifying information of a destination mobile station apparatus to which said control information is transmitted, and wherein said mobile station apparatus comprises:

a reception unit which receives a signal transmitted over the downlink physical control channels from said base station apparatus;

a demodulation unit which demodulates the signal received by said reception unit;

a decoding unit which decodes partial data respectively read out in order from a head of the data demodulated by said demodulation unit by varying a data starting position and a data length; and a determination unit which determines whether or not an identifying information of said mobile station apparatus is included in said control information obtained respectively by demodulating said partial data.

8. A communication method comprising:

calculating a total amount of control information transmitted on a plurality of physical control channels, calculating a ratio between the calculated total amount of the control information and a total number of resource units included in a wireless resource designated for mapping of the plurality of physical control channels, and determining a number of resource units to be allocated to each of the plurality of downlink physical control channels based on the calculated ratio and an amount of data of control information transmitted on each of the plurality of physical control channels;

encoding the control information respectively transmitted over each of the plurality of physical control channels into data which can be transmitted by said determined number of resource units;

interconnecting continuously a series of the encoded control information; and modulating the series of the encoded control information, wherein said control information includes an identifying information of a destination communication apparatus to which said control information is transmitted.

* * * * *